United States Patent
Kuwabara

(10) Patent No.: US 11,329,910 B2
(45) Date of Patent: May 10, 2022

(54) TRANSMISSION APPARATUS INCLUDING A PLURALITY OF SWITCHES AND OUTPUT CIRCUITS FOR TRANSMITTING DATA AND TRANSMISSION METHOD

(71) Applicant: FUJITSU LIMITED, Kawasaki (JP)

(72) Inventor: Takashi Kuwabara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 149 days.

(21) Appl. No.: 16/151,872

(22) Filed: Oct. 4, 2018

(65) Prior Publication Data

US 2019/0116115 A1  Apr. 18, 2019

(30) Foreign Application Priority Data

Oct. 16, 2017 (JP) .............................. JP2017-200370

(51) Int. Cl.
*H04L 45/28* (2022.01)
*H04L 41/0668* (2022.01)
(Continued)

(52) U.S. Cl.
CPC .......... *H04L 45/28* (2013.01); *H04L 41/0668* (2013.01); *H04L 49/25* (2013.01);
(Continued)

(58) Field of Classification Search
CPC ..... H04L 45/28; H04L 41/0668; H04L 49/25; H04L 49/557; H04L 69/22;
(Continued)

(56) References Cited

U.S. PATENT DOCUMENTS 6,842,422 B1   1/2005  Bianchini, Jr.
6,894,970 B1 *  5/2005  McDermott, III .... H04L 49/357
                                                370/218
(Continued)

FOREIGN PATENT DOCUMENTS

JP       2001-57574     2/2001
JP       2001-203749    7/2001
(Continued)

OTHER PUBLICATIONS

JPOA—Office Action of Japanese Patent Application No. 2017-200370 dated Jun. 8, 2021 with machine translation.

*Primary Examiner* — Ian N Moore
*Assistant Examiner* — Latresa A Mccallum
(74) *Attorney, Agent, or Firm* — Fujitsu Patent Center

(57) ABSTRACT

A transmission apparatus, includes a plurality of input circuits, N+1 switches (N is a natural number of 2 or larger), and a plurality of output circuits, wherein a first input circuit divides inputted data into partial data in a predetermined length, and distributes to the N+1 switches continuous M pieces of partial data (M is a natural number of 2 or larger and N or smaller) and horizontal parities calculated over the M pieces of partial data for every the continuous M pieces of partial data obtained from the division, and a first output circuit restores the data inputted to the first input circuit and outputs the restored data using at least any of the M pieces
(Continued)

of partial data and the horizontal parities which are distributed by the first input circuit to the N+1 switches and are transferred by the N+1 switches.

11 Claims, 18 Drawing Sheets

(51) Int. Cl.
*H04L 69/22* (2022.01)
*H04L 49/25* (2022.01)
*H04L 49/55* (2022.01)
*H04L 41/0803* (2022.01)

(52) U.S. Cl.
CPC ............ *H04L 49/557* (2013.01); *H04L 69/22* (2013.01); *H04L 41/0803* (2013.01)

(58) Field of Classification Search
CPC ..... H04L 41/0803; H04L 43/02; H04L 69/04; H04L 47/2483; G06F 11/202; H04W 28/06
See application file for complete search history.

(56) References Cited

U.S. PATENT DOCUMENTS

| | | | | |
|---|---|---|---|---|
| 6,934,305 | B1 * | 8/2005 | Duschatko | ............ H04L 45/583 370/503 |
| 8,472,484 | B2 * | 6/2013 | Sugai | .................... H04L 49/109 370/516 |
| 8,830,993 | B1 * | 9/2014 | Dublin | .................... H04L 49/00 370/376 |
| 2001/0030649 | A1 * | 10/2001 | Mamiya | .................. H04L 29/06 345/530 |
| 2002/0080510 | A1 * | 6/2002 | Maru | ................ H03M 13/2957 360/46 |
| 2008/0170591 | A1 * | 7/2008 | Kameyama | ........... H04L 1/0072 370/476 |
| 2017/0310387 | A1 | 10/2017 | Cai et al. | |
| 2017/0310413 | A1 | 10/2017 | Cai et al. | |
| 2017/0310538 | A1 | 10/2017 | Cai et al. | |
| 2017/0311060 | A1 | 10/2017 | Cai et al. | |

FOREIGN PATENT DOCUMENTS

| | | |
|---|---|---|
| JP | 2004-274214 | 9/2004 |
| JP | 2012-114588 | 6/2012 |
| JP | 2016-143942 | 8/2016 |

* cited by examiner

FIG. 15

| ODU SEGMENT 0-0 /1500 | XOR | ODU SEGMENT 0-1 /1501 | XOR | ODU SEGMENT 0-2 /1502 | = | PARITY SEGMENT 0-P /1503 |
|---|---|---|---|---|---|---|
| 11110110 | | 10001011 | | 01010001 | | 00101100 |
| 01010100 | | 11000101 | | 00110100 | | 10100101 |
| 01110011 | | 01100100 | | 00011100 | | 00001011 |
| 11000110 | | 00111001 | | 01100110 | | 10011001 |
| 01001011 | | 01100110 | | 00000010 | | 00101111 |
| 10011101 | | 01010001 | | 11110000 | | 00111100 |
| 01011011 | | 01000111 | | 10010011 | | 10001111 |
| 11001001 | | 11011000 | | 11100010 | | 11110011 |

| ODU SEGMENT 1-0 /1510 | XOR | ODU SEGMENT 1-1 /1511 | XOR | ODU SEGMENT 1-2 /1512 | = | PARITY SEGMENT 1-P /1513 |
|---|---|---|---|---|---|---|
| 10111100 | | 10100101 | | 11101100 | | 11110101 |
| 01100110 | | 11100110 | | 01100001 | | 11100001 |
| 10101100 | | 10001100 | | 10001100 | | 10101100 |
| 11010011 | | 11011011 | | 11001111 | | 11000111 |
| 11110011 | | 01110000 | | 11101001 | | 01101010 |
| 11111010 | | 11011110 | | 11100000 | | 11000100 |
| 00000000 | | 11101101 | | 01010011 | | 10111110 |
| 01011000 | | 01001101 | | 10001011 | | 10011110 |

| ODU SEGMENT 2-0 /1520 | XOR | ODU SEGMENT 2-1 /1521 | XOR | ODU SEGMENT 2-2 /1522 | = | PARITY SEGMENT 2-P /1523 |
|---|---|---|---|---|---|---|
| 01111101 | | 11100000 | | 00010000 | | 10001101 |
| 11001010 | | 00000100 | | 11001110 | | 00000000 |
| 10100101 | | 11101101 | | 11001011 | | 10000011 |
| 00100111 | | 11101101 | | 01001111 | | 10000101 |
| 11000101 | | 01111000 | | 00011001 | | 10100100 |
| 00000000 | | 00011001 | | 01110111 | | 01101110 |
| 01100001 | | 01111001 | | 01110010 | | 01101010 |
| 10001100 | | 00000011 | | 00010000 | | 10011111 |

| ODU SEGMENT 3-0 /1530 | XOR | ODU SEGMENT 3-1 /1531 | XOR | ODU SEGMENT 3-2 /1532 | = | PARITY SEGMENT 3-P /1533 |
|---|---|---|---|---|---|---|
| 11011101 | | 01000000 | | 11010001 | | 01001100 |
| 01101001 | | 01001011 | | 01001001 | | 01101011 |
| 01110001 | | 11100010 | | 10101011 | | 00111000 |
| 11010010 | | 10111100 | | 01100101 | | 00001011 |
| 10111000 | | 00011110 | | 00000100 | | 10100010 |
| 00010001 | | 11111001 | | 11101011 | | 00000011 |
| 10011001 | | 11000010 | | 00010100 | | 01001111 |
| 11110000 | | 01001011 | | 01011000 | | 11100011 |

FIG. 16

| ODU SEGMENT 0-0 /1500 | XOR | ODU SEGMENT 0-1 /1501 | XOR | ODU SEGMENT 0-2 /1502 | = | PARITY SEGMENT 0-P /1503 |
|---|---|---|---|---|---|---|
| ~~11110110~~ | | 10001011 | | 01010001 | | 00101100 |
| ~~01010100~~ | | 11000101 | | 00110100 | | 10100101 |
| ~~01110011~~ | | 01100100 | | 00011100 | | 00001011 |
| ~~10000110~~ | | 00111001 | | 01100110 | | 10011001 |
| ~~01001011~~ | | 01100110 | | 00000010 | | 00101111 |
| ~~10011101~~ | | 01010001 | | 11110000 | | 00111100 |
| ~~01011011~~ | | 01000111 | | 10010011 | | 10001111 |
| ~~11001001~~ | | 11011000 | | 11100010 | | 11110011 |

1601

| ODU SEGMENT 1-0 /1510 | XOR | ODU SEGMENT 1-1 /1511 | XOR | ODU SEGMENT 1-2 /1512 | = | PARITY SEGMENT 1-P /1513 |
|---|---|---|---|---|---|---|
| 10111100 | | 10100101 | | ~~11101100~~ | | 11110101 |
| 01100110 | | 11100110 | | ~~01100001~~ | | 11100001 |
| 10101100 | | 10001100 | | ~~10001100~~ | | 10101100 |
| 11010011 | | 11011011 | | ~~11001111~~ | | 11000111 |
| 11110011 | | 01110000 | | ~~11101011~~ | | 01101010 |
| 11111010 | | 11011110 | | ~~11100000~~ | | 11000100 |
| 00000000 | | 11101101 | | ~~01010011~~ | | 10111110 |
| 01011000 | | 01001101 | | ~~10001011~~ | | 10011110 |

1602

| ODU SEGMENT 2-0 /1520 | XOR | ODU SEGMENT 2-1 /1521 | XOR | ODU SEGMENT 2-2 /1522 | = | PARITY SEGMENT 2-P /1523 |
|---|---|---|---|---|---|---|
| 01111101 | | 11100000 | | 00010000 | | ~~10001101~~ |
| 11001010 | | 00000100 | | 11001110 | | ~~00000000~~ |
| 10100101 | | 11101101 | | 11001011 | | ~~10000111~~ |
| 00100111 | | 11101101 | | 01001111 | | ~~10000101~~ |
| 11000101 | | 01111000 | | 00011001 | | ~~10100100~~ |
| 00000000 | | 00011001 | | 01110111 | | ~~01101110~~ |
| 01100001 | | 01111001 | | 01110010 | | ~~01101010~~ |
| 10001100 | | 00000011 | | 00010000 | | ~~10011111~~ |

1603

| ODU SEGMENT 3-0 /1530 | XOR | ODU SEGMENT 3-1 /1531 | XOR | ODU SEGMENT 3-2 /1532 | = | PARITY SEGMENT 3-P /1533 |
|---|---|---|---|---|---|---|
| 11011101 | | ~~01000000~~ | | 11010001 | | 01001100 |
| 01101001 | | ~~01001011~~ | | 01001001 | | 01101011 |
| 01110001 | | ~~11100010~~ | | 10101011 | | 00111000 |
| 11010010 | | ~~10111100~~ | | 01100101 | | 00001011 |
| 10111000 | | ~~00011110~~ | | 00000100 | | 10100010 |
| 00010001 | | ~~11111001~~ | | 11101011 | | 00000011 |
| 10011001 | | ~~11000010~~ | | 00010100 | | 01001111 |
| 11110000 | | ~~01101011~~ | | 01011000 | | 11100011 |

| | ODU SEGMENT 0-1 /1501 | XOR | ODU SEGMENT 0-2 /1502 | XOR | PARITY SEGMENT 0-P /1503 | = | ODU SEGMENT 0-0 /1500 |
|---|---|---|---|---|---|---|---|
| /1500 ~~11110110~~ | 10001011 | | 01010001 | | 00101100 | | 11110110 |
| ~~01010100~~ | 11000101 | | 00110100 | | 10100101 | | 01010100 |
| 1601 ~~01110011~~ | 01100100 | | 00011100 | | 00001011 | | 01110011 |
| ~~10000110~~ | 00111001 | | 01100110 | | 10011001 | | 11000110 |
| ~~01001011~~ | 01100110 | | 00000010 | | 00101111 | | 01001011 |
| ~~10011101~~ | 01010001 | | 11110000 | | 00111100 | | 10011101 |
| ~~01011011~~ | 01000111 | | 10010011 | | 10001111 | | 01011011 |
| ~~11001001~~ | 11011000 | | 11100010 | | 11110011 | | 11001001 |

| ODU SEGMENT 1-0 /1510 | XOR | ODU SEGMENT 1-1 /1511 | XOR | ODU SEGMENT /1512 | | PARITY SEGMENT 1-P /1513 | = | ODU SEGMENT 1-2 |
|---|---|---|---|---|---|---|---|---|
| 10111100 | | 10100101 | | ~~11101100~~ | | 11110101 | | 11101100 |
| 01100110 | | 11100110 | | ~~01100001~~ | | 11100001 | | 01100001 |
| 10101100 | | 10001100 | | ~~10001100~~ | | 10101100 | | 10001100 |
| 11010011 | | 11011011 | 1602 | ~~11001111~~ | | 11000111 | | 11001111 |
| 11110011 | | 01110000 | | ~~11101011~~ | | 01101010 | | 11101001 |
| 11111010 | | 11011110 | | ~~11100000~~ | | 11000100 | | 11100000 |
| 00000000 | | 11101101 | | ~~01010011~~ | | 10111110 | | 01010011 |
| 01011000 | | 01001101 | | ~~10001011~~ | | 10011110 | | 10001011 |

| ODU SEGMENT 2-0 /1520 | XOR | ODU SEGMENT 2-1 /1521 | XOR | ODU SEGMENT 2-2 /1522 | | /1523 | = | PARITY SEGMENT 2-P |
|---|---|---|---|---|---|---|---|---|
| 01111101 | | 11100000 | | 00010000 | | ~~10001101~~ | | 10001101 |
| 11001010 | | 00000100 | | 11001110 | 1603 | ~~00000000~~ | | 00000000 |
| 10100101 | | 11101101 | | 11001011 | | ~~10000011~~ | | 10000011 |
| 00100111 | | 11101101 | | 01001111 | | ~~10000101~~ | | 10000101 |
| 11000101 | | 01111000 | | 00011001 | | ~~10100100~~ | | 10100100 |
| 00000000 | | 00011001 | | 01110111 | | ~~01101110~~ | | 01101110 |
| 01100001 | | 01111001 | | 01110010 | | ~~01101010~~ | | 01101010 |
| 10001100 | | 00000011 | | 00010000 | | ~~10011111~~ | | 10011111 |

| ODU SEGMENT 3-0 /1530 | XOR | /1531 | XOR | ODU SEGMENT 3-2 /1532 | | PARITY SEGMENT 3-P /1533 | = | ODU SEGMENT 3-1 |
|---|---|---|---|---|---|---|---|---|
| 11011101 | | ~~01000000~~ | | 11010001 | | 01001100 | | 01000000 |
| 01101001 | | ~~01001011~~ | | 01001001 | | 01101011 | | 01001011 |
| 01110001 | | ~~11100010~~ | | 10101011 | | 00111000 | | 11100010 |
| 11010010 | | ~~10111100~~ | | 01100101 | | 00001011 | | 10111100 |
| 10111000 | | ~~00011110~~ | | 00000100 | | 10100010 | | 00011110 |
| 00010001 | | ~~11111001~~ | | 11101011 | | 00000011 | | 11111001 |
| 10011001 1604 | | ~~11000010~~ | | 00010100 | | 01001111 | | 11000010 |
| 11110000 | | ~~01101011~~ | | 01011000 | | 11100011 | | 01001011 |

TRANSMISSION APPARATUS INCLUDING A PLURALITY OF SWITCHES AND OUTPUT CIRCUITS FOR TRANSMITTING DATA AND TRANSMISSION METHOD

CROSS-REFERENCE TO RELATED APPLICATION

This application is based upon and claims the benefit of priority of the prior Japanese Patent Application No. 2017-200370, filed on Oct. 16, 2017, the entire contents of which are incorporated herein by reference.

FIELD

The embodiments discussed herein are related to a transmission apparatus and a transmission method.

BACKGROUND

There has been known a technology that generates a parity packet based on a data packet, and orderly arranges and transmits the data packet and the parity packet according to a packet transmission order rule. There also has been known a technology that uses two parity packets on a reception side to perform erasure correction of a data packet. In addition, there has been known a technology that arranges a plurality of data packets in a matrix, generates parity packets at least in a horizontal direction or a vertical direction based on the matrix, and transmits the data packets and the parity packets.

However, if a TDM cross-connect apparatus is implemented by a general-purpose packet switch using a CE technology, for example, and the packet switch is redundantly configured to 1+1 or the like, for example, a total switching capacity and a total link bandwidth become large, and cost and power consumption increase.

In view of this, it is possible to redundantly configure the packet switch to 1:N or the like. However, if the packet switch is redundantly configured to 1:N or the like, there is a problem that in a case of a switch failure or a link fault, the packet switch to which each of the data packet is distributed needs to be dynamically controlled so that a failed switch or a faulty link is avoided, thus causing a temporary service disruption. Moreover, if the packet switch is redundantly configured to 1:N or the like, there is another problem that in a case where a packet is errored or discarded, retransmission of the errored or discarded packet occurs, thus increasing transmission delay.

The CE stands for Circuit Emulation. The CE technology is a technology that emulates a TDM circuit to a packet (segment) and processes the packet. The TDM stands for Time Division Multiplexing. The TDM cross-connect apparatus is an apparatus that performs cross-connect processing in a time-division multiplex manner.

The followings are reference documents.
[Document 1] Japanese Laid-open Patent Publication No. 2016-143942,
[Document 2] Japanese Laid-open Patent Publication No. 2012-114588, and
[Document 3] Japanese Laid-open Patent Publication No. 2004-274214.

SUMMARY

According to an aspect of the embodiments, a transmission apparatus, includes a plurality of input circuits that includes a first input circuit, N+1 switches (N is a natural number of 2 or larger), and a plurality of output circuits that includes a first output circuit, wherein the first input circuit divides inputted data into partial data in a predetermined length, and distributes to the N+1 switches continuous M pieces of partial data (M is a natural number of 2 or larger and N or smaller) and horizontal parities calculated over the M pieces of partial data for every the continuous M pieces of partial data obtained from the division, and the first output circuit restores the data inputted to the first input circuit and outputs the restored data using at least any of the M pieces of partial data and the horizontal parities which are distributed by the first input circuit to the N+1 switches and are transferred by the N+1 switches.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is a diagram illustrating an example of segments according to the embodiment;

FIG. 16 is a diagram illustrating an example of bit errors in the segments according to the embodiment;

FIG. 17 is a diagram illustrating an example of recovery of discarded segments according to the embodiment.

DESCRIPTION OF EMBODIMENTS

A transmission apparatus and a transmission method according to the embodiments are described below in detail, with reference to the drawings.

EMBODIMENTS (Transmission Apparatus According to Embodiment)

Figure 1:
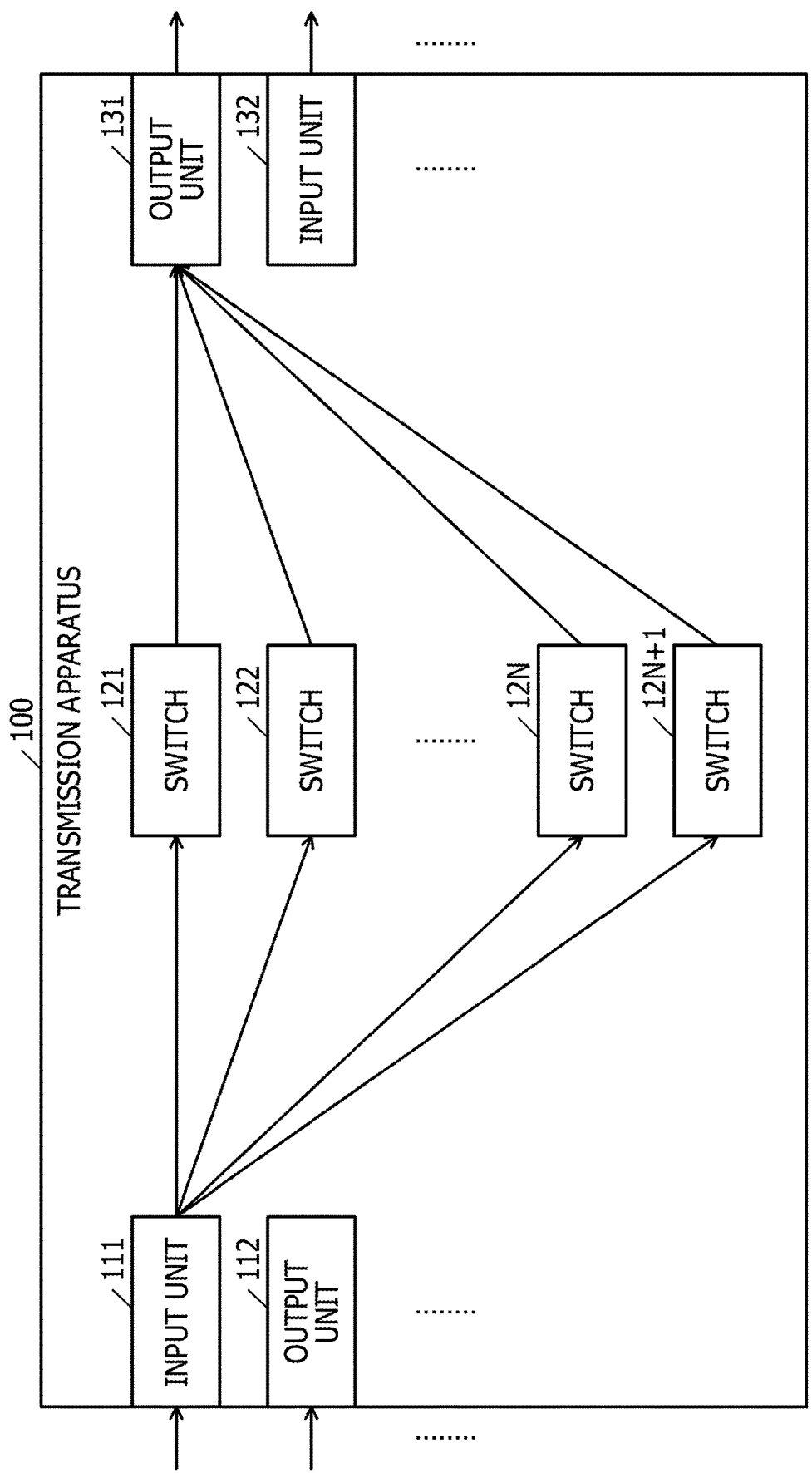
FIG. 1 is a diagram illustrating an example of a transmission apparatus according to an embodiment.

FIG. 1 is a diagram illustrating an example of a transmission apparatus according to an embodiment. As illustrated in FIG. 1, the transmission apparatus 100 according to the embodiment includes a plurality of input units 111, 112, ..., N+1 switches 121 to 12N+1, and a plurality of output units 131, 132, .... N is a natural number of 2 or larger. The input units 111, 112, ... are two or more input units, for example. The output unit 131, 132, ... are two or more output units, for example.

The transmission apparatus 100 is a cross-connect apparatus that outputs, from any of the respective output units 131, 132, ..., each piece of data outputted from the input units 111, 112, ..., for example, using the switches 121 to 12N+1. The transmission apparatus 100 may also use externally provided switches 121 to 12N+1, without including the switches 121 to 12N+1.

FIG. 1 describes a case where the transmission apparatus 100 outputs, from the output unit 131, the data inputted from the input unit 111, using the switches 121 to 12N+1. For example, the input unit 111 divides the inputted data into pieces of partial data in a predetermined length. For every continuous M pieces of partial data obtained by the division, the input unit 111 distributes the M pieces of partial data and horizontal parities calculated over the M pieces of partial data to the switches 121 to 12N+1.

M is a natural number of 2 or larger and N or smaller. For example, if N=3 and M=3, for first partial data, second partial data, third partial data, ... that are obtained by the division, the input unit 111 calculates the horizontal parities based on exclusive OR (XOR) of the first to third partial data. The input unit 111 transmits the first partial data to the switch 121, the second partial data to the switch 122, and third partial data to the switch 123. The input unit 111 transmits the horizontal parities calculated over the first to third partial data to the switches 12N+1.

Similarly, the input unit 111 transmits fourth partial data to the switch 121, fifth partial data to the switch 122, and sixth partial data to the switch 123. The input unit 111 transmits the horizontal parities calculated over the fourth to sixth partial data to the switches 12N+1.

In short, for k=0, 1, 2, 3, ..., the input unit 111 distributes $(3 \times k+1)^{th}$ partial data to the switch 121, $(3 \times k+2)^{th}$ partial data to the switch 122, and $(3 \times k+3)^{th}$ partial data to the switch 123. The input unit 111 also distributes the horizontal parities calculated over the $(3 \times k+1)^{th}$ partial data, the $(3 \times k+2)^{th}$ partial data, and the $(3 \times k+3)^{th}$ partial data to the switch 12N+1.

However, load balancing method of the continuous M pieces of partial data and the horizontal parities calculated the continuous M pieces of partial data is not limited to such static distribution, and dynamic distribution, for example, may be deployed. By way of example, the may be switch toward which the horizontal parities are distributed may be different for every continuous M pieces of partial data.

Each of the switches 121 to 12N+1 transfers to the output unit 131 the partial data or the horizontal parities transmitted from the input unit 111. For example, a destination address indicating the output unit 131 is assigned to the partial data and the horizontal parities transmitted from the input unit 111 to the switches 121 to 12N+1. Each of the switches 121 to 12N+1 looks up the destination address and transfers the partial data or the horizontal parities to the output unit 131.

The output unit 131 restores the data inputted to the input unit 111, with using at least M pieces of information from the M+1 pieces of information consisting of the M pieces of partial data and the horizontal parities that are distributed by the input unit 111 to the switches 121 to 12N+1 and transferred by the switches 121 to 12N+1. For example, when successfully being able to receive the continuous M pieces of partial data, the output unit 131 may restore the data by reordering and reassembling the M pieces of partial data When not being able to successfully receive one piece of partial data of the continuous M pieces of partial data, the output unit 131 recovers the one piece of unsuccessfully received partial data, by calculating the XOR over the successfully received M−1 pieces of partial data and the horizontal parities. Then, the output unit 131 may restore the data by reordering and reassembling the recovered one piece of partial data and the successfully received M−1 pieces of partial data.

In this manner, according to the transmission apparatus 100, for every continuous M pieces of partial data obtained by the division of the data inputted to the input unit 111, the M pieces of partial data and the horizontal parities based on the M pieces partial data may be distributed to the switches 121 to 12N+1. This allows the output unit 131 to restore and output the data inputted to the input unit 111, using at least any of the M pieces of partial data and the horizontal parities transferred by the switches 121 to 12N+1.

Even though the output unit 131 does not successfully receive one piece of information of three pieces of the partial data and the horizontal parities due to, for example, a fault or an error in the apparatus, it is possible to calculate the information on the lost one piece and restore the original data, through XOR calculation of the remaining three pieces of information. This negates necessity of the retransmission of the lost pieces of information, thereby making it possible to preserve low transmission delay.

While the processing in the case where transmission apparatus 100 outputs from the output unit 131 the data inputted from the input unit 111 is described, similar processing may be applied to a case where the transmission apparatus 100 outputs from each of the output units 131, 132, ... the data inputted from the input unit 112, ....

In addition, the total bandwidth [bps] of the data that can be processed by the switches 121 to 12N+1 is wider than the total of the maximum bandwidth of the data that may be received from each of the input units 111, 112, ..., for example, and narrower than twice of the total of the maximum bandwidth of the data that may be received from each of the input units 111, 112, ....

By way of example, the total bandwidth of the data that can be processed by the switches 121 to 12N is equal to the total of the maximum bandwidth of the data that may be received from each of the input units 111, 112, .... In this case, the transmission apparatus 100 has the redundant configuration of 1:N that includes the switch 12N+1 as a protection switch for any one of the working switches 121 to 12N. Thus, since the horizontal parities can be transmitted through the protection switch 12N+1 with using the surplus bandwidth for equipment protection, no additional bandwidth to transmit the horizontal parities is required.

In addition, the total bandwidth of the data that is processed by the switches 121 to 12N+1 in the 1:N redundant configuration can be less than that in the redundant configuration of 1+1 or 1:1 requiring twice of the total of the maximum bandwidth of the data that may be received from the each of input units 111, 112, . . . . This makes it possible to reduce the number of the switches 121 to 12N+1 (the value of N) or the bandwidth of the data that needs to be processed by each of the switches 121 to 12N+1.

However, the transmission apparatus 100 is not limited to the redundant configuration of 1:N, and may have the redundant configuration of 2:N that includes the switches 12N+2, in addition to the configuration of the transmission apparatus 100 illustrated in FIG. 1. In this case, N shall be 3 or larger.

In addition, the input unit 111 assigns sequence numbers indicating the order of the transmission of the segments to headers appended to every partial data in order to indicate the order of the segmentation for the reordering and the horizontal parities in order to indicate the M pieces of partial data protected by the horizontal parities for the segment recovery. Here, the sequence number assigned to each of the horizontal parities may be able to be derived through the bitwise XOR calculation over the sequence numbers assigned to the M pieces of partial data protected by the horizontal parities. In this case, the afore-mentioned M shall be $M=2^m-1$ (m is a natural number of 2 or larger).

By way of example, a case is assumed where a 16-bit sequence number is counted from 0 to 65,535 and then returns to 0 again. With this, the combination forming a parity group consisting of M+1 packets (segments) of the continuous M pieces of partial data and the horizontal parities calculated over the M pieces of partial data can be identified by the most significant (16−Log$_2$(M+1)) bits of the sequence number. In addition, the individual packets belonging to each parity group can be mutually identified by the least significant Log$_2$(M+1) bits of the sequence number.

Furthermore, the afore-mentioned N may be $N+1=2^{(m+k)}$ (k is a natural number of 0 or larger). This allows the input unit 111 to statically distribute the packets (segments) belonging to each parity group to the switches 121 to 12N+1 by looking up the least significant (m+k) bits of the sequence number. Thus, a circuit of the input unit 111 may be simplified.

The packet (segment) carrying the partial data transmitted from the input unit 111 may include a padding which is inserted so that the length of the packet is fixed, and the header indicating the length of the partial data before the padding is inserted. With this, the length of the packets transmitted from the input unit 111 can be fixed even though the length of the partial data obtained by the division of the data inputted to the input unit 111 is varied partial data by partial data. In addition, on the reception side, it also becomes possible to determine the original length of the partial data and correctly reproduce the partial data by referring to the header of the packet.

The input unit 111 may append a forward error correction (FEC) code to each of the headers assigned to the packets (segments). In c this case, the output unit 131 corrects errors in the header of the packet using the FEC code that are appended and transmitted by the input unit 111 and transferred by the switches 121 to 12N+1.

Furthermore, the output unit 131 checks the normality of the headers each assigned to the packets (segments) after the FEC processing. The normality of the headers is checked based on whether or not the header conforms to a predetermined format or whether or not a value of each of the header contents is a value within a predetermined range. Then, the output unit 131 discards the packet carrying the partial data or the horizontal parities if any error is detected on the packet header. This may avoid the sequence number or the like included in the header being mistakenly accepted, thus encouraging the lost segment to be recovered, or preventing data from being mistakenly restored.

(Cross-Connect Apparatus to which Transmission Apparatus According to Embodiment is Applied)

Figure 2:
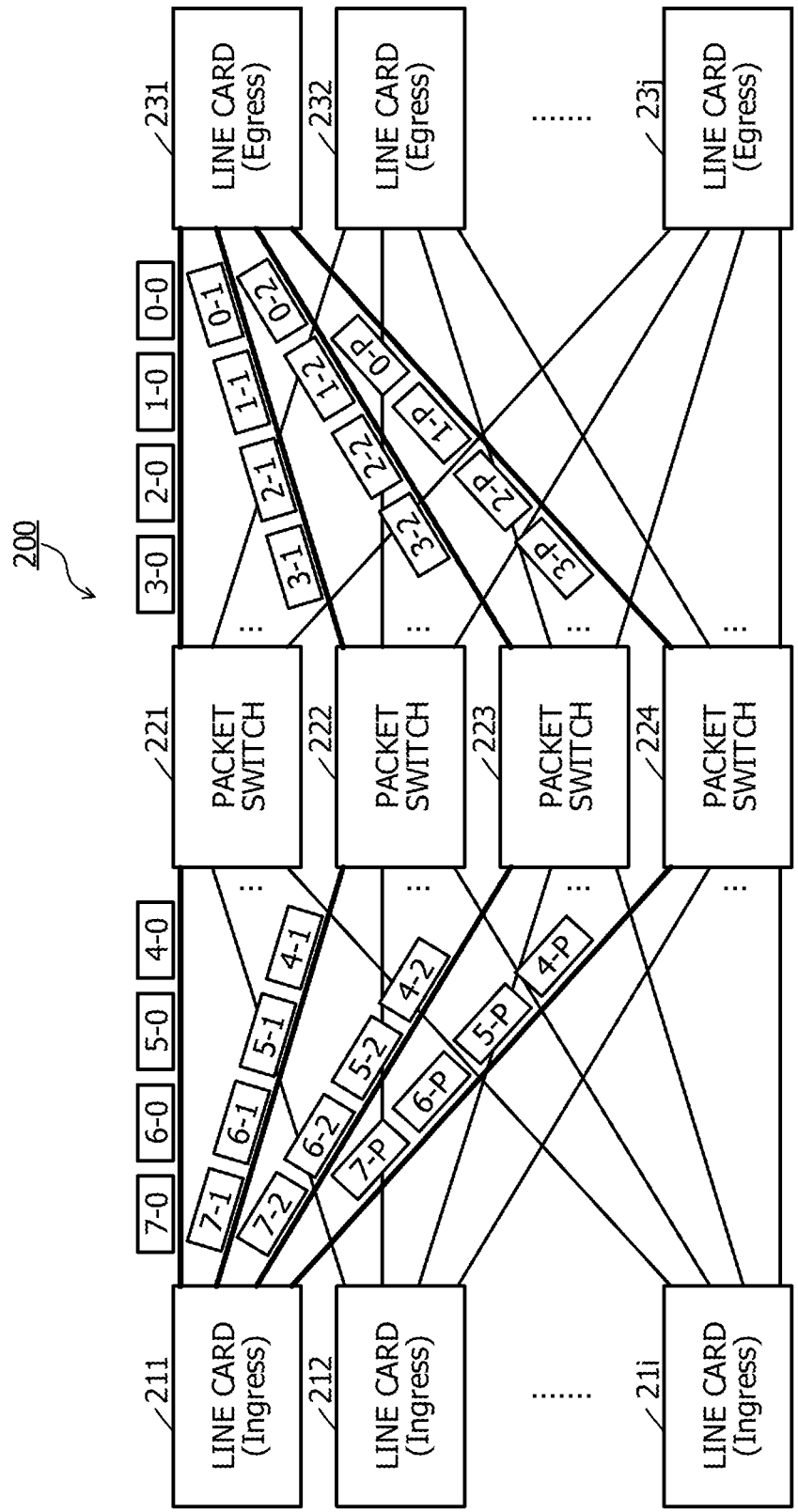
FIG. 2 is a diagram illustrating an example of a cross-connect apparatus to which the transmission apparatus according to the embodiment is applied.

FIG. 2 is a diagram illustrating an example of a cross-connect apparatus to which the transmission apparatus according to the embodiment is applied. The transmission apparatus 100 illustrated in FIG. 1 may be applied to the cross-connect apparatus 200 illustrated in FIG. 2, for example. Using the CE technology, the cross-connect apparatus 200 performs the TDM cross-connect processing with the general-purpose packet switch.

For example, with the CE technology that emulates the TDM circuit to the segment (packet) and processes the segment, the cross-connect apparatus 200 implements the TDM cross connect processing that performs the cross-connection between the time-division multiplexed input and output channels using the general-purpose switch. Such a configuration is described in the OFP implementation agreement by OIF, for example. OIF stands for Optical Internetworking Forum. OFP stands for OTN over packet Fabric Protocol.

For example, the cross-connect apparatus 200 includes i line cards 211 to 21i on the ingress of the apparatus, 4 packet switches 221 to 224, and j line cards 231 to 23j on the egress.

The input units 111, 112, . . . illustrated in FIG. 1 may be implemented by the ingress line cards 211 to 21i illustrated in FIG. 2. The switches 121 to 12N+1 illustrated in FIG. 1 may be implemented by packet switches 221 to 224 illustrated in FIG. 2. The output units 131, 132, . . . illustrated in FIG. 1 may be implemented by the egress line cards 231 to 23j illustrated in FIG. 2. In an example illustrated in FIG. 2, a case is described where the afore-mentioned N and M are N=M=3.

For example, the cross-connect apparatus 200 performs cross-connection of ODU signals. ODU stands for Optical-channel Data Unit. Note that various types of interfaces such as optical fibers or electric cables may be used for the transmission of the segments (packets) among the Ingres line cards 211 to 21i, the packet switches 221 to 224, and the egress line cards 231 to 23j.

The cross-connect apparatus 200 has the redundant configuration of 1:N (N=3) that includes the packet switch 224, in addition to the N packet switches 221 to 223 having the switching capacity equal to the total of the maximum bandwidth of the segments (packets) received from each of the line cards 211 to 21i.

By way of example, the maximum bandwidth of data inputted to each of the line cards 211 to 21i may be 200 [Gbps] and the maximum bandwidth of the segments (packets) carrying the partial data (excluding horizontal parities) transmitted from each of the line cards 211 to 21i may be 300 [Gbps]. Then, the bandwidth of the segments that can be processed by each of the packet switches 221 to 224 for each of the line cards may be 100 [Gbps]. In this case, the total bandwidth of the segments that can be processed by the packet switches 221 to 223 for each of the line cards is 300 [Gbps], which is equal to the maximum bandwidth of the segments carrying the partial data transmitted from each of the line cards 211 to 21i. Therefore, the cross-connect apparatus 200 has the redundant configuration of 1:N (N=3) that includes the packet switch 224 as the redundant equipment for any one of the packet switches 221 to 223.

Each of the line cards 211 to 21*i* distributes the segments (packets) carrying a part of the inputted original data to the packet switches 221 to 224. Each of the packet switches 221 to 224 transmits the respective segments received from the line cards 211 to 21*i* to any of the line cards 231 to 23*j*. Each of the line cards 231 to 23*j* restores the original data based on the respective segments received from the packet switches 221 to 224 and transmits the restored original data.

FIG. 2 describes a case where the data inputted to the line card 211 is transmitted from the line card 231. In the example illustrated in FIG. 2, using the packet switches 221 to 223, the line card 211 transfers respective ODU segments carrying the partial data obtained by dividing the inputted data. The line card 211 also transfers parity segments carrying the horizontal parities, using the packet switch 224.

The line card 211 divides the inputted data into the ODU segments, and distributes the ODU segments to the packet switches 221 to 223. The line card 211 also transmits to the packet switch 224 the parity segment that is calculated over the three consecutive ODU segments distributed to the packet switches 221 to 223.

For example, the line card 211 transmits the first ODU segment marked as "0-0" to the packet switch 221 and the second ODU segment "0-1" to the packet switch 222. The line card 211 also transmits the third ODU segment "0-2" to the packet switch 223. In addition, the line card 211 transmits the parity segment "0-P" to the packet switch 224, the parity segment "0-P" being derived through the bitwise XOR calculation over "0-0", "0-1", and "0-2". That is, "0-P"="0-0" XOR "0-1" XOR "0-2".

Next, the line card 211 transmits the fourth ODU segment "1-0" to the packet switch 221 and the fifth ODU segment "1-1" to the packet switch 222. The line card 211 also transmits the sixth ODU segment "1-2" to the packet switch 223. In addition, the line card 211 transmits the parity segment "1-P" to the packet switch 224, the parity segment "1-P" being derived through the bitwise XOR calculation over "1-0", "1-1", and "1-2". That is, "1-P"="1-0" XOR "1-1" XOR "1-2".

Next, the line card 211 transmits the seventh ODU segment "2-0" to the packet switch 221 and the eighth ODU segment "2-1" to the packet switch 222. The line card 211 also transmits the ninth ODU segment "2-2" to the packet switch 223. In addition, the line card 211 transmits the parity segment "2-P" to the packet switch 224, the parity segment "2-P" being derived through the bitwise XOR calculation over "2-0", "2-1", and "2-2". That is, "2-P"="2-0" XOR "2-1" XOR "2-2".

Similarly in the following, the line card 211 distributes each of three consecutive ODU segments to the packet switches 221 to 223, respectively, and also distributes the parity segments each for the three consecutive ODU segments to the packet switch 224

Each of the packet switches 221 to 224 may be the general-purpose commodity switch such as an L2 switch or an L3 switch, for example. Each of the packet switches 221 to 224 transmits to the line card 231 the segments received from the line card 211. For example, the packet switch 221 transmits to the line card 231 "0-0", "1-0", "2-0", "3-0", "4-0", "5-0", "6-0", "7-0", . . . , which are the ODU segments received from the line card 211. The packet switch 222 transmits to the line card 231 "0-1", "1-1", "2-1", "3-1", "4-1", "5-1", "6-1", "7-1", . . . , which are the ODU segments received from the line card 211.

The packet switch 223 transmits to the line card 231 "0-2", "1-2", "2-2", "3-2", "4-2", "5-2", "6-2", "7-2", . . . , which are the ODU segments received from the line card 211. The packet switch 224 transmits to the line card 231 "0-P", "1-P", "2-P", "3-P", "4-P", "5-P", "6-P", "7-P", . . . , which are the parity segments received from the line card 211.

The line card 231 restores the data inputted to the line card 211 from the segments received from the packet switches 221 to 224. For example, the line cad 231 gets the ODU segments "0-0", "0-1", and "0-2" from at least three of the four segments of "0-0", "0-1", "0-2", and "0-P" received from the packet switches 221 to 224. The line card 231 also gets the ODU segments "1-0", "1-1", and "1-2" from at least three of the four segments of "1-0", "14", "1-2", and "1-P" received from the packet switches 221 to 224.

Similarly in the following, the line card 231 gets three consecutive ODU segments from at least three of four segments received from the packet switches 221 to 224. Then, the line card 231 restores the data inputted to the line card 211 by reordering and reassembling the recovered ODU segments and outputs the restored data.

(Segment Recovery in Case of Switch Failure in Cross-connect Apparatus According to Embodiment)

Figure 3:
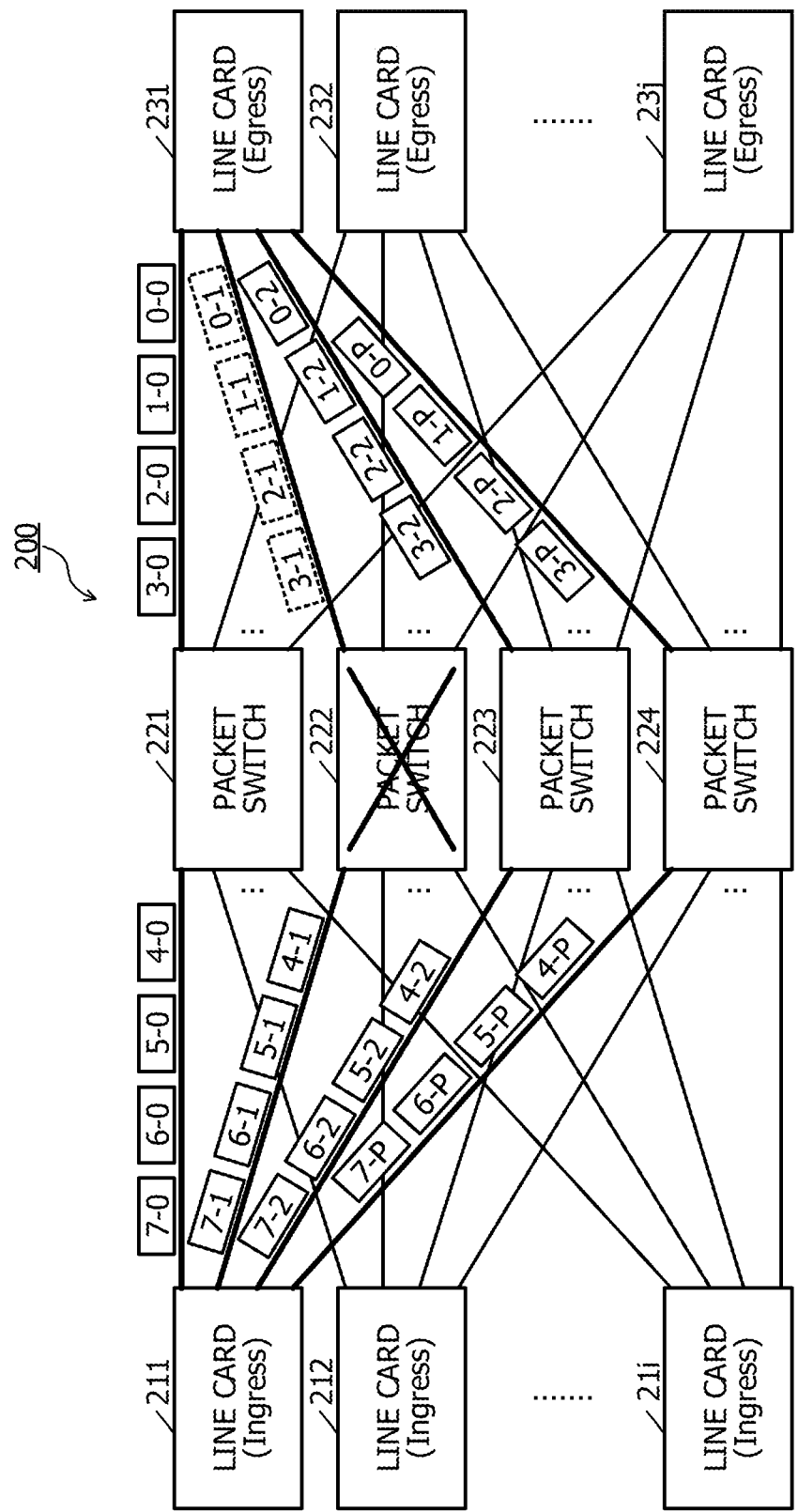
FIG. 3 is a diagram illustrating an example of segment recovery in the case of a switch failure in the cross-connect apparatus according to the embodiment.

FIG. 3 is a diagram illustrating an example of segment recovery in the case of a switch failure in the cross-connect apparatus according to the embodiment. In FIG. 3, identical symbols are assigned to parts similar to the parts illustrated in FIG. 2, and an explanation of the parts is omitted. FIG. 3 describes a case where the packet switch 222 fails, and ODU segments "0-1", "1-1", "2-1", . . . transmitted by the line card 211 toward the packet switch 222 do not reach the line card 231.

In this case, the line card 231 recovers the lost ODU segment "0-1" by the bitwise XOR calculation over the segments "0-0", "0-2", and "0-P" received from the packet switches 221, 223, and 224 which are not failed. The line card 231 also recovers the lost ODU segment "1-1" by the bitwise XOR calculation over the segments "1-0", "1-2", and "1-P".

Similarly in the following, the line card 231 recovers the lost ODU segments due to the failure of the packet switch 222 by the bitwise XOR calculation over the segments received from the packet switches 221, 223, and 224. This allows the line card 231 to get the every ODU segments transmitted from the line card 211 and thus to restore the original data without any service disruption, even though the packet switch 222 fails.

(Segment Recovery in Case of Link Fault in Cross-Connect Apparatus According to Embodiment)

Figure 4:
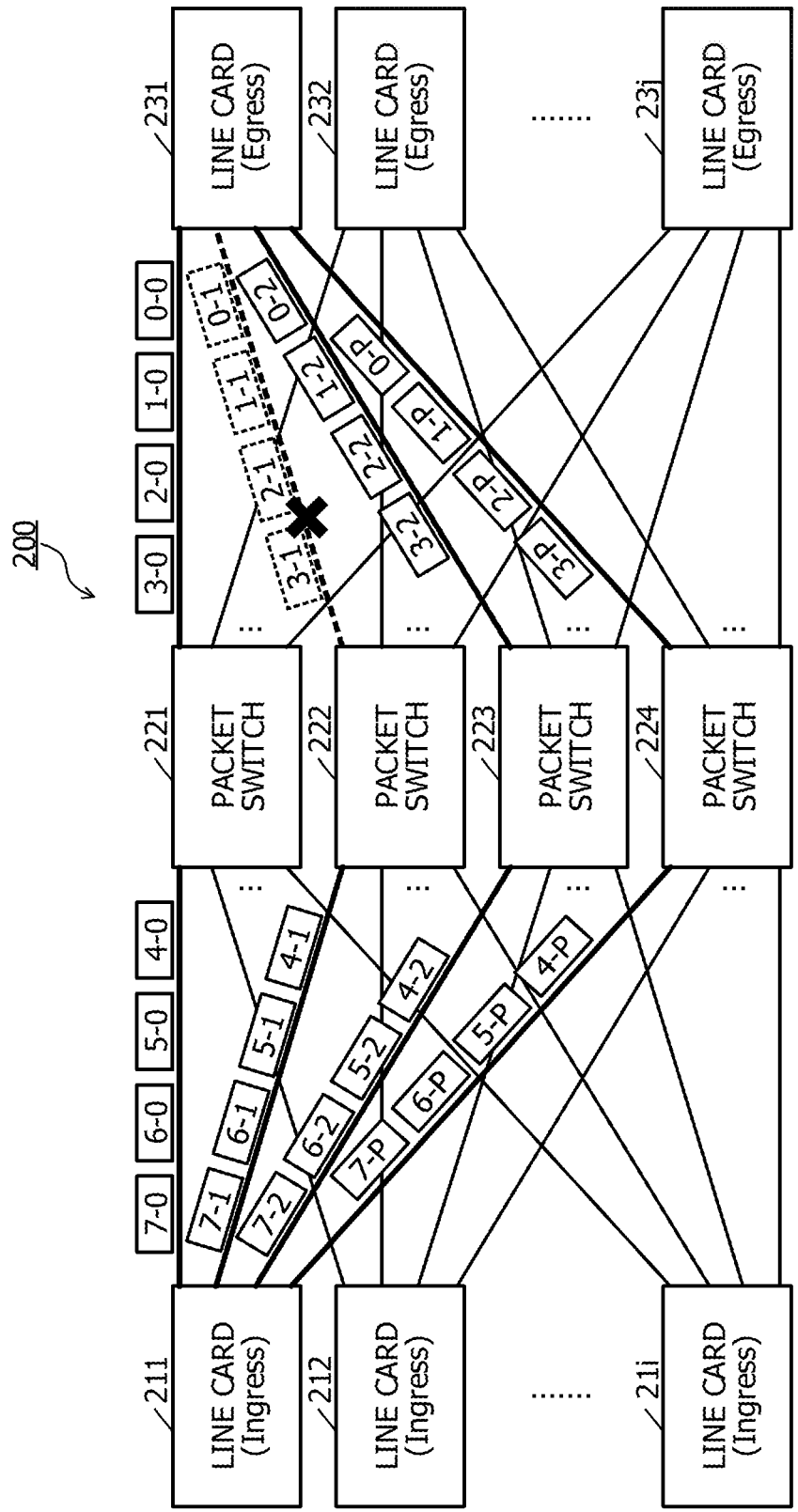
FIG. 4 is a diagram illustrating an example of the segment recovery in the case of a link fault in the cross-connect apparatus according to the embodiment.

FIG. 4 is a diagram illustrating an example of the segment recovery in the case of a link fault in the cross-connect apparatus according to the embodiment. In FIG. 4, identical symbols are assigned to parts similar to the parts illustrated in FIG. 2, and an explanation of the parts is omitted. FIG. 4 describes a case where a link between the packet switch 222 and the egress line card 231 fails, and ODU segments "0-1", "1-1", "2-1", . . . transmitted by the line card 211 to the packet switch 222 do not reach the line card 231.

In this case, similarly to the example illustrated in FIG. 3, the line card 231 recovers the lost ODU segment due to the link fault by the bitwise XOR calculation over the segments received from the packet switches 221, 223, and 224. This allows the line card 231 to get the every ODU segments transmitted from the line card 211 and thus to restore the original data without any service disruption, even though the link between the packet switch 222 and the line card 231 fails.

(Segment Recovery in Case of Error Occurrence in Cross-Connect Apparatus According to Embodiment)

Figure 5:
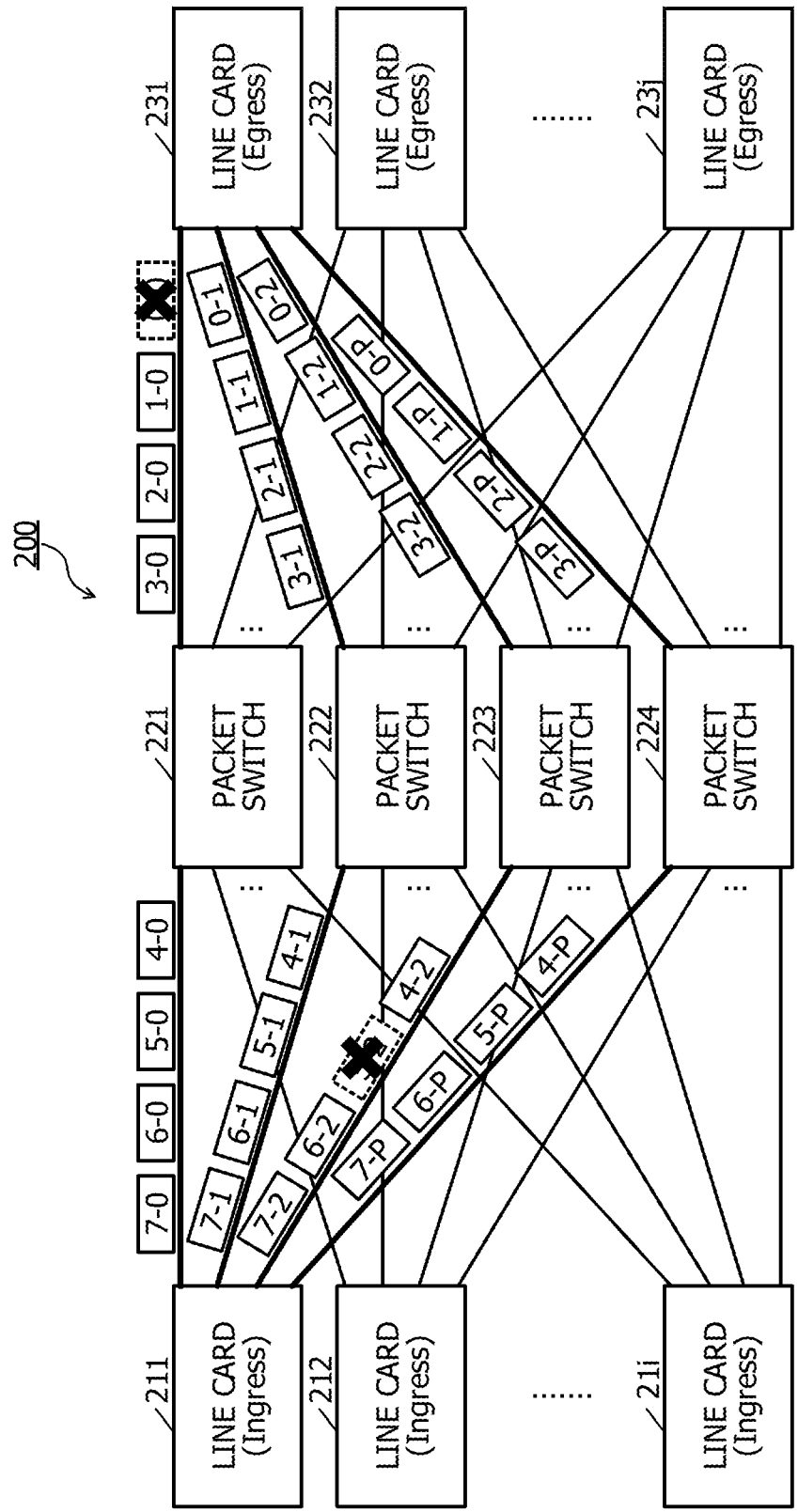
FIG. 5 is a diagram illustrating an example of the segment recovery in the case of error occurrence in the cross-connect apparatus according to the embodiment.

FIG. 5 is a diagram illustrating an example of the segment recovery in the case of error occurrence in the cross-connect apparatus according to the embodiment. In FIG. 5, identical symbols are assigned to parts similar to the parts illustrated in FIG. 2, and an explanation of the parts is omitted. FIG. 5 describes a case where an ODU segment "0-0" is errored on the link from the packet switch 221 to the line card 231 and is discarded by the line card 231 due to the error, and another ODU segment "5-2" is errored on the link from the line card 211 to the packet switch 223, is discarded by the packet switch 223 due to the error, and does not reach the line card 231.

In this case, the line card 231 recovers the errored ODU segment "0-0" which is discarded due to the error by the line card 231 itself by the bitwise XOR calculation over the segments "0-1", "0-2", and "0-P" which are normally delivered. The line card 231 also recovers the lost ODU segment "5-2" which has been discarded due to the error by the packet switch 223 and is not delivered to the line card 231 by the bitwise XOR calculation over the segments "5-0", "5-1", and "5-P" which are normally delivered.

Similarly in the following, the line card 231 recovers the errored or the lost segment which is discarded by any preceding packet switches 221 to 224 or the line card 231 itself due to the error detected and is not correctly delivered by the bitwise XOR calculation over the other three segments belonging to the same parity group as the discarded segment which are normally delivered. This allows the line card 231 to get the every ODU segments transmitted from the line card 211 and thereby to restore the original data without any service disruption, even though some segments are errored or dropped.

As illustrated in FIGS. 3 to 5, if the line card 231 keeps successfully receiving at least three of four segments which belongs to the same parity group and are distributed by the line card 211 through the packet switches 221 to 224, the line card 231 can restore the original data and continue the service.

In this manner, the cross-connect apparatus 200 utilizes the surplus bandwidth (the switching capacity of the protecting packet switch 224) for the 1:N (1:3) switch redundancy to transmit the horizontal parities and may restore the original data even when some segments do not reach the line card 231. This eliminates the need for dynamic control of the load balancing distributor or the selector bridge for the 1:N switch redundancy by the ingress to avoid any failed switch or any failed link, and thereby encourages the hitless equipment protection without any service disruption upon a single switch or a link failure. Also, the cross-connect apparatus 200 can be simplified, since there is no need to implement a protocol notifying the failure occurrence and requesting the dynamic control of the load-balancer or the bridge from the egress to the ingress, and, for example, the dynamic load balancing circuits to distribute the segments with avoiding the failed switch or the failed link. In addition, this also eliminates the need for retransmission of the errored or the discarded segments, and thereby makes it possible to preserve low transmission delay. Also, the cross-connect apparatus 200 can be further simplified, since there is no need to implement a protocol notifying the errored or the discarded segments and requesting the retransmission of the lost segments from the egress to the ingress.

(Ingress Line Card According to Embodiment)

Figure 6:
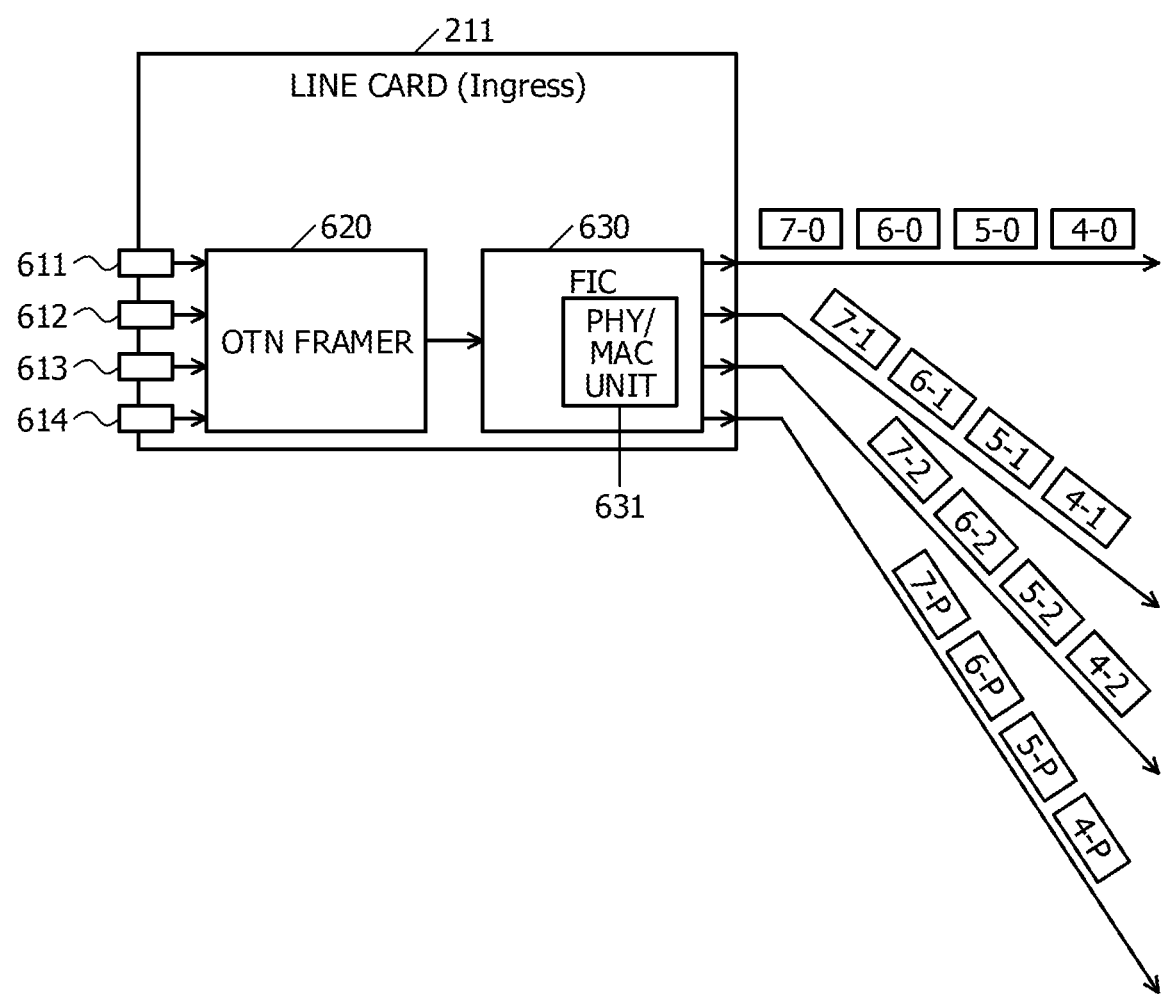
FIG. 6 is a diagram illustrating an example of an ingress line card according to the embodiment.

FIG. 6 is a diagram illustrating an example of an ingress line card according to the embodiment. While FIG. 6 describes the line card 211, the line cards 212 to 21i are also similar to the line card 211. The line card 211 includes line interface modules 611 to 614, an OTN framer 620, and a FIC 630. OTN stands for Optical Transport Network. FIC stands for Fabric Interface Chip.

Each of the line interface modules 611 to 614 receives an OTU signal or a client signal such as Ethernet. Note that Ethernet is a registered trademark. OTU stands for Optical-channel Transport Unit. For example, the line interface modules 611 to 614 are QSFP28/QSFP+modules or the like. Each of the line interface modules 611 to 614 outputs the received signal to the OTN framer 620. QSFP stands for Quad Small Form-factor Pluggable.

The OTN framer 620 performs processing such as termination of the OTU and the client signals received from the line interface modules 611 to 614, ODU demultiplexing from the higher-order (HO) OTU signal, mapping of the client signal into the ODU signal, segmentation of the constant bit rate (CBR) ODU signal into artificial ODU segments, and so on. ODU stands for Optical-channel Data Unit. The OTN framer 620 outputs the ODU segments to the FIC 630.

The FIC 630 appends a header to each of the ODU segments received from the OTN framer 620. The header consists of some header fields at layer 2 (L2) or layer 3 (L3), for example, and is used by the packet switches 221 to 224 to switch the ODU segments and by the egress line cards 231 to 23i to restore the original CBR ODU signal. The FIC 630 also generates the parity segments (horizontal parities) to protect the ODU segments from packet drops and errors. Also, the FIC 630 distributes the ODU and the parity segments to packet switches 221 to 224 for load balancing.

In addition, the FIC 630 has a PHY/MAC unit 631 that performs transmission processing at MAC layer and physical layer (PHY layer) for Ethernet frames carrying the ODU and the parity segments to be transmitted from the line card 211 to the packet switches 221 to 224. MAC stands for Media Access Control. The PHY/MAC unit 631 also appends the FCS to the Ethernet frame to monitor the link integrity from the line card 211 to the packet switches 221 to 224. FCS stands for Frame Check Sequence. The configuration of the FIC 630 is described below.

In the ingress line card 211 illustrated in FIG. 6, the segmentation processing of the input circuit that divides the data inputted to the line card 211 into the partial data in the predetermined unit may be implemented by the OTN framer 620, for example. In addition, the load balance processing of the input circuit that distributes the M pieces of partial data and the horizontal parities calculated over the M pieces of partial data to the N+1 switches, for every continuous M pieces of partial data obtained by the division, may be implemented by the FIC 630, for example.

(Packet Switch According to Embodiment)

Figure 7:
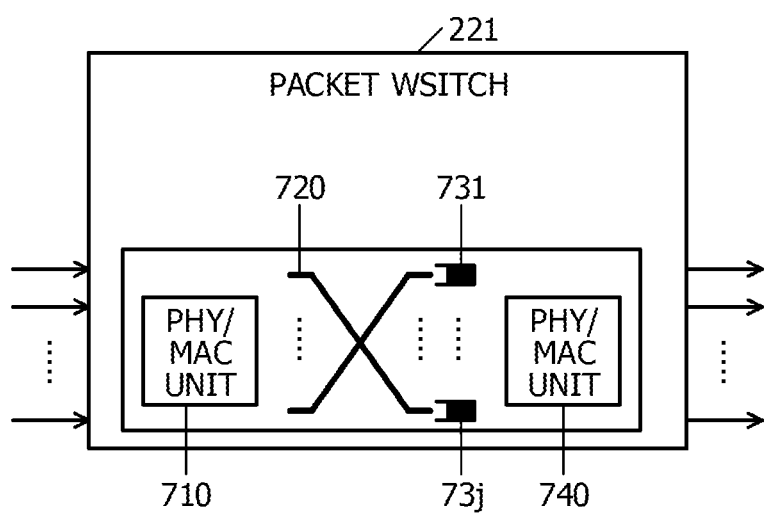
FIG. 7 is a diagram illustrating an example of a packet switch according to the embodiment.

FIG. 7 is a diagram illustrating an example of the packet switch according to the embodiment. While FIG. 7 describes the packet switch 221, the packet switches 222 to 224 are similar to the packet switch 221. The packet switch 221 is the L2 or the L3 switch including an ingress PHY/MAC unit 710, a switching unit 720 that performs switching, packet buffers 731 to 73j, and an egress PHY/MAC unit 740.

The ingress PHY/MAC unit 710 performs reception processing at the physical layer and the MAC layer for the Ethernet frames carrying the ODU and the parity segments received from the ingress line cards 211 to 21i. FCS check is also performed on the received Ethernet frames and any segments carried in the Ethernet frames on which an FCS error is detected are discarded.

The switching unit 720 forwards the ODU or the parity segments received from the ingress line cards 211 to 21*i* toward the egress destination line cards 231 to 23*j* in accordance with the header appended by, for example, the ingress FIC 630.

The packet buffers 731 to 73*j* are output queues to store and forward the ODU or the parity segments toward the line cards 231 to 23*j*, respectively. Here, congestion at each of the packet buffers 731 to 73*j* may cause tail drop of the segments.

The egress PHY/MAC unit 740 performs the transmission processing at the MAC layer and the physical layer on the ODU or the parity segments received from the packet buffers 731 to 73*j*, and transmits Ethernet frames carrying the segments to the egress line cards 231 to 23*j*, respectively. Here, the FCS is appended to the respective Ethernet frames to the egress line cards 231 to 23*j* to monitor the link integrity from the packet switch 221 to the egress line cards 231 to 23*j*.

(Egress Line Card According to Embodiment)

Figure 8:
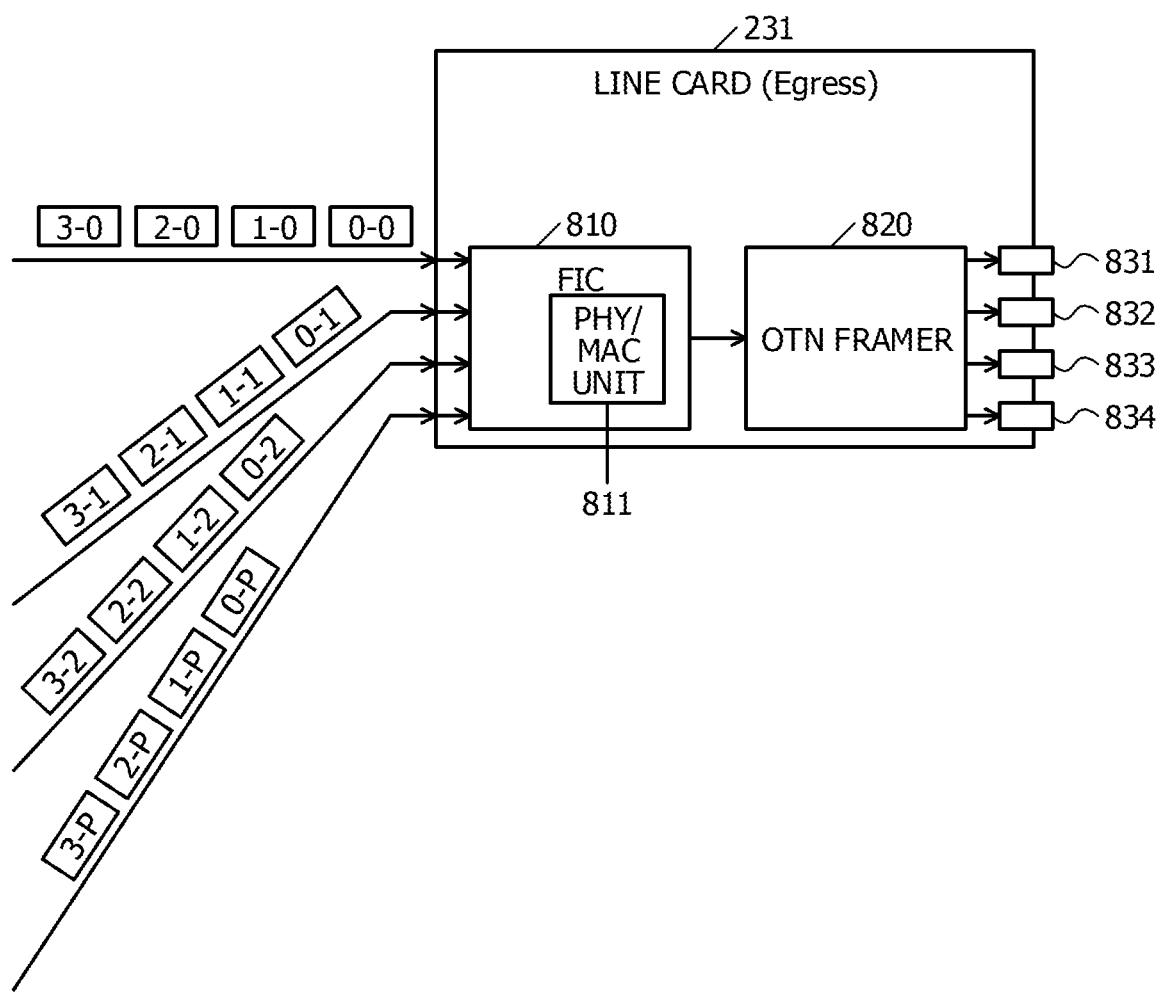
FIG. 8 is a diagram illustrating an example of an egress line card according to the embodiment.

FIG. 8 is a diagram illustrating an example of the egress line card according to the embodiment. While FIG. 8 describes the line card 231, the line cards 232 to 23*j* are similar to the line card 231. The line card 231 includes a FIC 810, an OTN framer 820, and line interface modules 831 to 834.

The FIC 810 includes a PHY/MAC unit 811 that performs the reception processing at the physical layer and the MAC layer on the Ethernet frames carrying the ODU and the parity segments received from the packet switches 221 to 224. FCS check is also performed on the received Ethernet frames and any segments carried in the Ethernet frames on which an FCS error is detected are discarded. The FIC 810 also performs recovery of the erroneous or discarded ODU segments with using the parity segments, reordering of the ODU segments into the order of the segmentation at the ingress line cards 211 to 21*i*, and so on. The FIC 810 outputs to the OTN framer 820 the recovered and reordered ODU segments. The functionalities of the ingress FIC 630 and the egress FIC 810 are described below in detail.

The OTN framer 820 performs reassembly of the ODU segments received from the FIC 810 into the original CBR ODU signal, ODU multiplexing into the HO OTU signal, demapping of the client signal from the ODU signal, termination of the OTU and the client signals, and so on. The OTN framer 820 outputs the OTU signal and the client signal such as Ethernet reproduced by the processing to the line interface modules 831 to 834.

Each of the line interface modules 831 to 834 transmits an OTU signal or a client signal received from the OTN framer 820. For example, the line interface modules 831 to 834 are the QSFP28/QSFP+modules or the like, for example.

In the egress line card 231 illustrated in FIG. 8, the recovery processing of the output circuit that recovers an errored or a discarded piece of partial data using the M pieces of partial data and the horizontal parities which are distributed by the ingress line cards 211 to 21*i* to the N+1 packet switches 221 to 224 and are transferred by the packet switches and the reorder processing of the output circuit that reorders the recovered pieces of partial data into the order of the segmentation may be implemented by the FIC 810, for example. In addition, the reassemble processing of the output circuit that reassemble the recovered and reordered pieces of partial data to complete the restoration of the data inputted to the ingress line card 211 to 21*i* and transmits the restored data may be implemented by the OTN framer 820, for example.

(FIC According to Embodiment)

Figure 9:
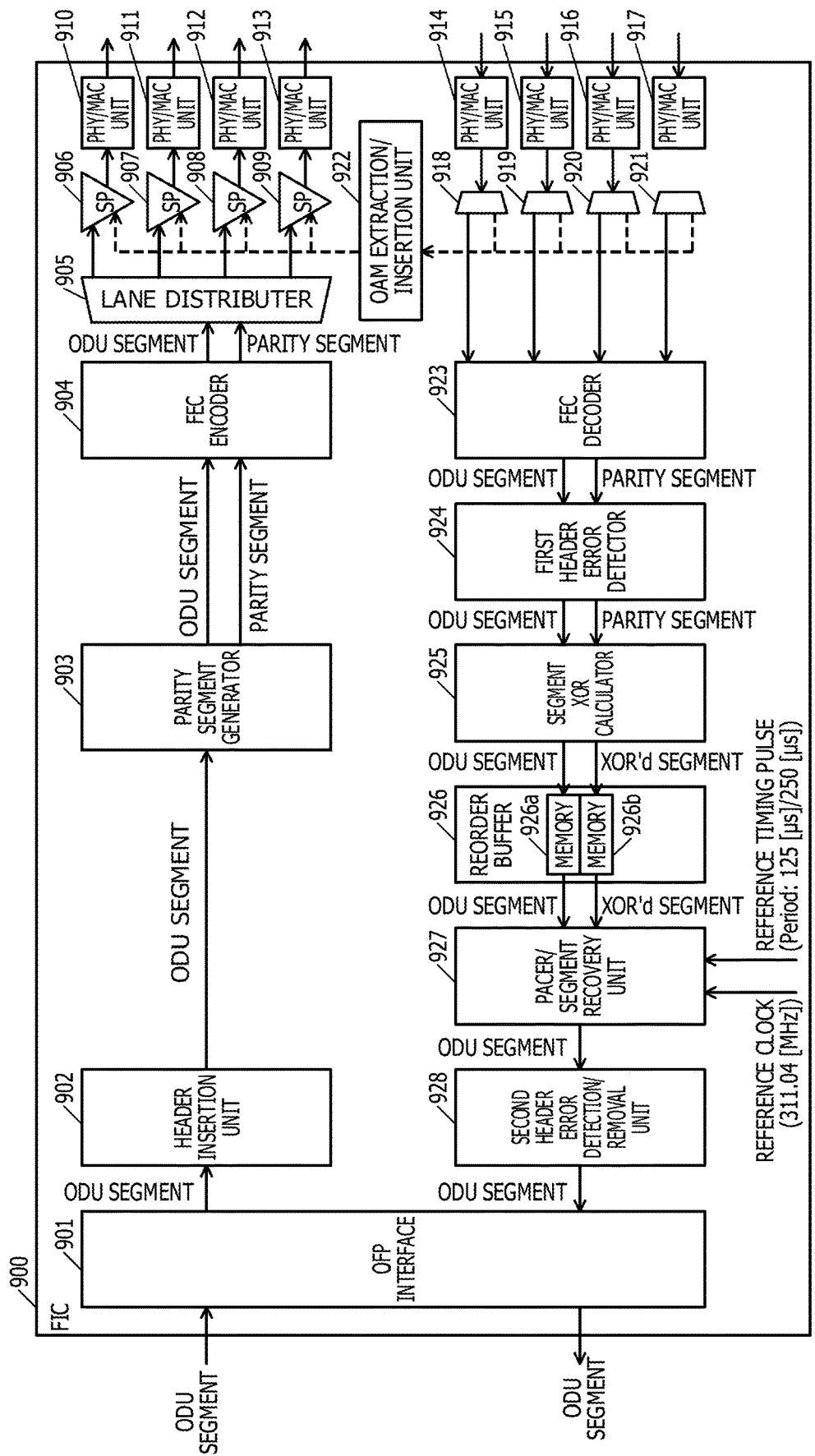
FIG. 9 is a diagram illustrating an example of a FIC according to the embodiment.

FIG. 9 is a diagram illustrating an example of the FIC according to the embodiment. For example, each of the FIC 630 illustrated in FIG. 6 and the FIC 810 illustrated in FIG. 8 may be implemented by the FIC 900 illustrated in FIG. 9. The FIC 900 includes an OFP interface 901, a header insertion unit 902, a parity segment generator 903, an FEC encoder 904, and a lane distributer 905. The FIC 900 also includes strict priority controllers 906 to 909, PHY/MAC units 910 to 917, parsers 918 to 921, and an OAM extraction/insertion unit 922. FIC 900 further includes an FEC decoder 923, a first header error detector 924, a segment XOR calculator 925, a reorder buffer 926, a pacer/segment recovery unit 927, and a second header error detection/removal unit 928.

FEC stands for Forward Error Correction. OAM stands for Operation Administration Maintenance.

The ingress processing of the FIC 630 illustrated in FIG. 6 includes, for example, each of processing of the OFP interface 901, the header insertion unit 902, the parity segment generator 903, and the FEC encoder 904. The ingress processing of the FIC 630 illustrated in FIG. 6 also includes, for example, each of processing of the lane distributer 905, the strict priority controllers 906 to 909, and the PHY/MAC units 910 to 913. In addition, the processing of the PHY/MAC unit 631 illustrated in FIG. 6 is implemented by the PHY/MAC units 910 to 913. Here, a case is described where the FIC 900 is applied to the FIC 630 illustrated in FIG. 6.

The ODU segment sent from the OTN framer 620 is received by the OFP interface 901. The OFP interface 901 outputs the received ODU segment to the header insertion unit 902. By way of example, Interlaken, which is a standard protocol for transferring packets between components of a communication system, may be used for the OFP interface 901. In this case, the OFP interface 901 identifies an ODU channel of the received ODU segment from a Channel Number [39:32] field of a BCW (Control[63]=1, Type[62]=1) of the Interlaken. BCW stands for Burst Control Word. The received ODU (OFP) segment is the OFP header+ODU payload, for example.

The header insertion unit 902 performs PWE3 encapsulation on the ODU segment outputted from the OFP interface 901, and assigns a header for use by the packet switches 221 to 224 for switching. PWE3 stands for Pseudo Wire Emulation Edge to Edge. The header insertion unit 902 outputs to the parity segment generator 903 the ODU segment that is encapsulated and assigned with the header.

The parity segment generator 903 generates a parity segment based on the ODU segment outputted from the header insertion unit 902. For example, the parity segment generator 903 generates the parity segment by bitwise XOR calculation over the three consecutive ODU segments for every three consecutive ODU segments. Then, the parity segment generator 903 outputs to the FEC encoder 904 the three consecutive ODU segments and the parity segment generated from the three consecutive ODU segments.

Figure 14:
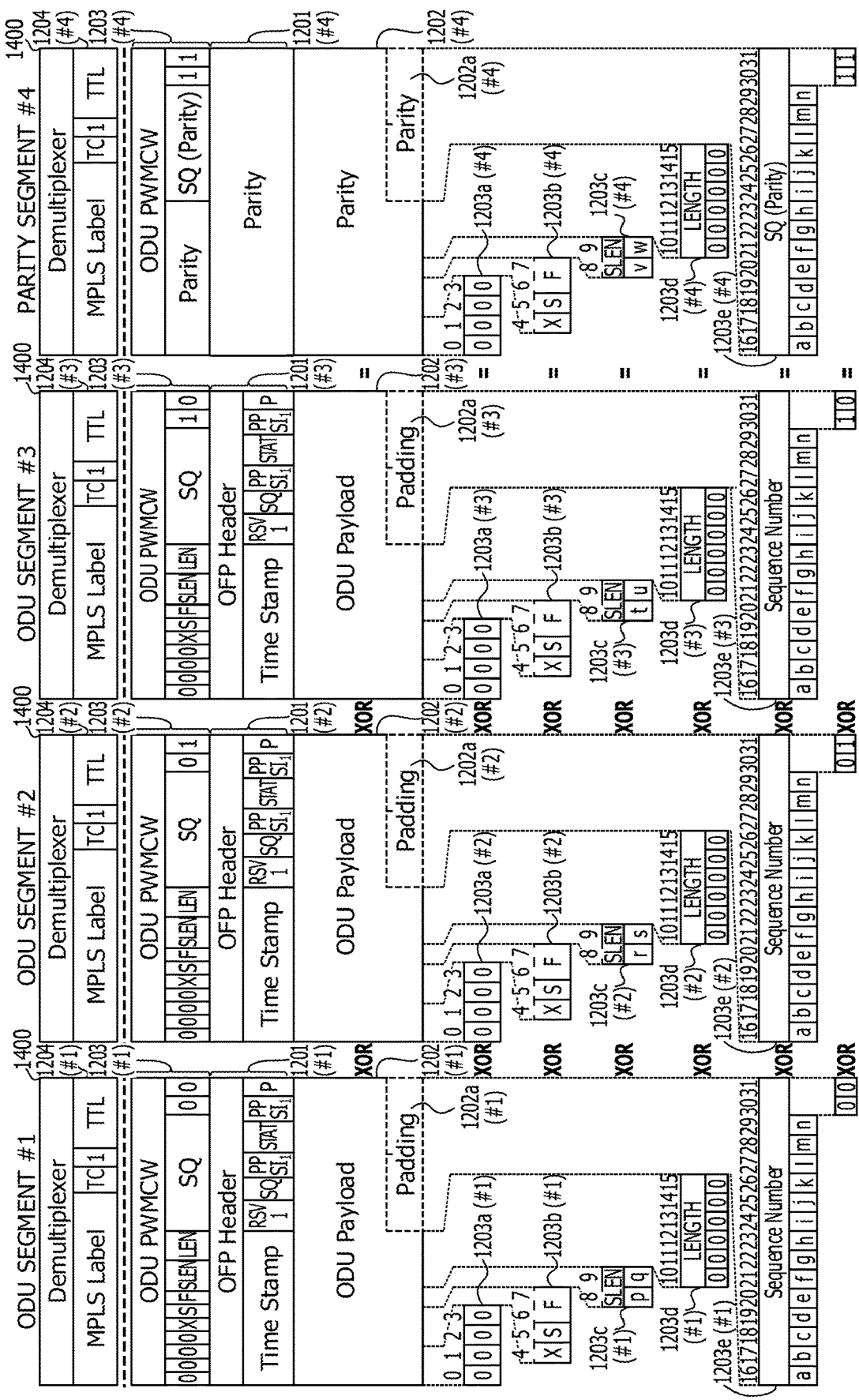
FIG. 14 is a diagram illustrating an example of calculation of a horizontal parity according to the embodiment.

The three consecutive ODU segments are three ODU segments having common 14 high-order bits of the PWMCW sequence number (Sequence Number [16:29]), for example (see FIG. 14, for example). PWMCW stands for Pseudo Wire MPLS Control Word. MPLS stands for Multi-Protocol Label Switching. The parity segment generator 903 performs bitwise XOR calculation over the Demultiplexer, the PWMCW, the OFP header, the ODU payload, and the padding fields of the three consecutive ODU segments, and generates a parity segment. The values of the header fields inserted into the parity segment are identical to the values of the header fields inserted into each of the corresponding ODU segments.

The FEC encoder 904 appends an FEC code to protect header fields of the ODU segment and the parity segment received from the parity segment generator 903. The FEC encoder 904 outputs FEC-encoded ODU segment and FEC-encoded parity segment to the lane distributer 905. For example, a code such as a RS code or a BCH code may be used for the FEC code. RS stands for Reed-Solomon. BCH stands for Bose Chaudhuri Hocquenghem.

For example, if the header fields such as the Demultiplexer or the PWMCW sequence number is errored, recovery of a lost segment is not possible and such a header error may cause wrong restoration which may adversely affect the other normal ODU channels. Thus, the FEC is appended to the header. A calculation range of the FEC may be 12 octets of the Demultiplexer (PW label), PWMCW, and OFP header fields, for example.

The lane distributer 905 is a load balancer and distributes and outputs the respective ODU and parity segments received from the FEC encoder 904 to the strict priority controllers 906 to 909. For example, the lane distributer 905 statically distributes the respective segments to one of the strict priority controllers 906 to 909 according to the least significant two bits of the PWMCW sequence number of the respective segments (Sequence Number [30:31]).

By way of example, the lane distributer 905 outputs the segment having the low-order two bits of "00" of the PWMCW sequence number to the strict priority controller 906 and the segment having the low-order two bits of "01" of the PWMCW sequence number to the strict priority controller 907. The lane distributer 905 also outputs the segment having the low-order two bits of "10" of the PWMCW sequence number to the strict priority controller 908 and the segment having the low-order two bits of "11" of the PWMCW sequence number to the strict priority controller 909. With this, the afore-mentioned three consecutive ODU segments may be evenly distributed to the strict priority controllers 906 to 908, and the parity segments may be always outputted to the strict priority controller 909.

The strict priority controllers 906 to 909 (SP: Strict Priority) each outputs the segments received from the lane distributer 905 to each of the PHY/MAC units 910 to 913. In addition, the strict priority controllers 906 to 909 output to each of the PHY/MAC units 910 to 913 OAM frames received from the OAM extraction/insertion unit 922 with a lower priority than the segments received from the lane distributer 905. This makes it possible to transmit the OAM frames with preserving Quality of Service (QoS) performance.

The PHY/MAC units 910 to 913 perform the transmission processing of the MAC layer and the physical layer of the Ethernet signal (100GBASE-SR4/CR4, or the like) on the respective segments and OAM frames received from the respective strict priority controllers 906 to 909. Each of the PHY/MAC units 910 to 913 outputs Ethernet signal carrying the respective segments and OAM frames to the corresponding one of the packet switches 221 to 224.

Figure 12:
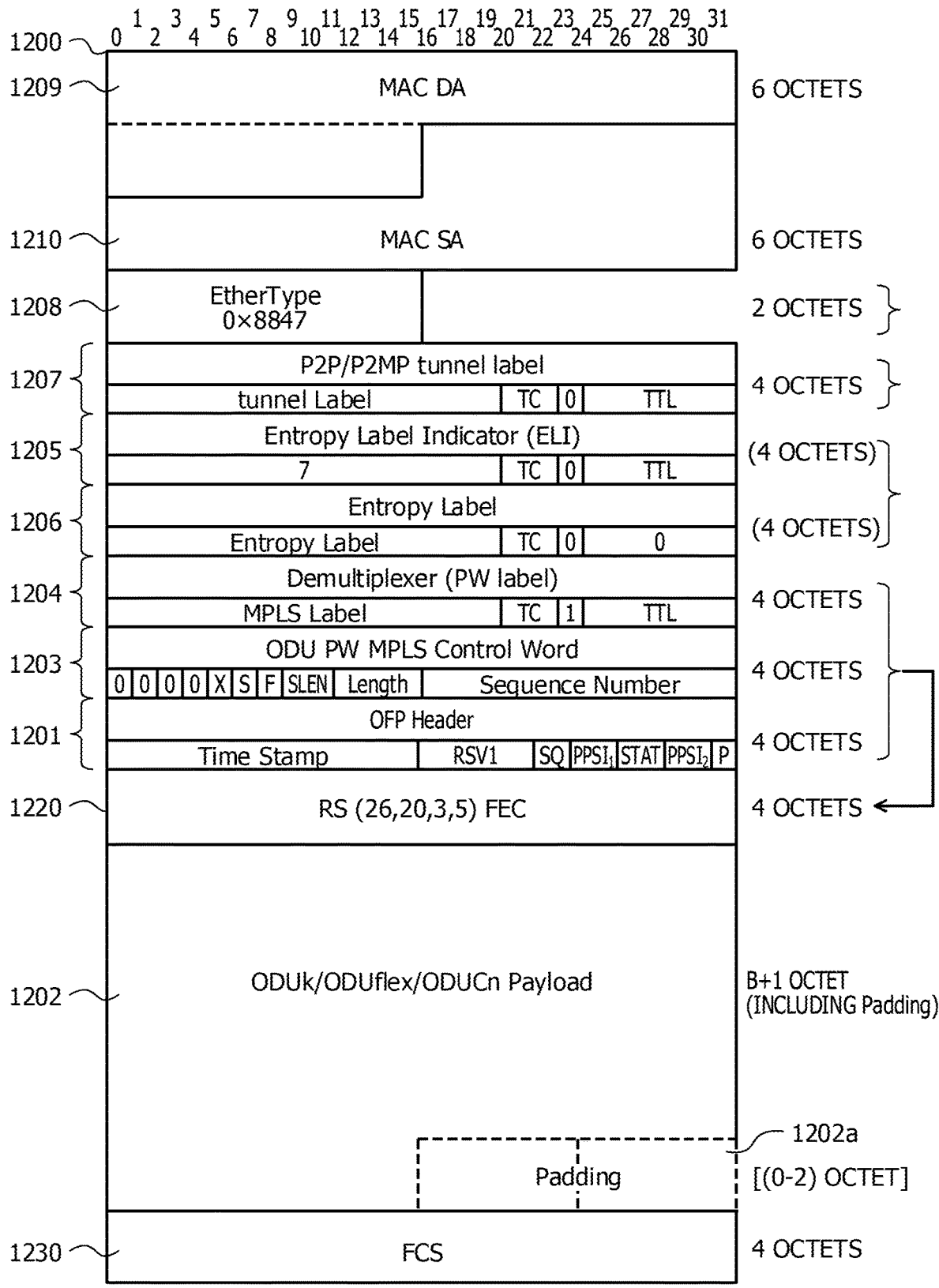
FIG. 12 is a diagram illustrating an example of a transmission format of an ODU segment according to the embodiment.
Figure 13:
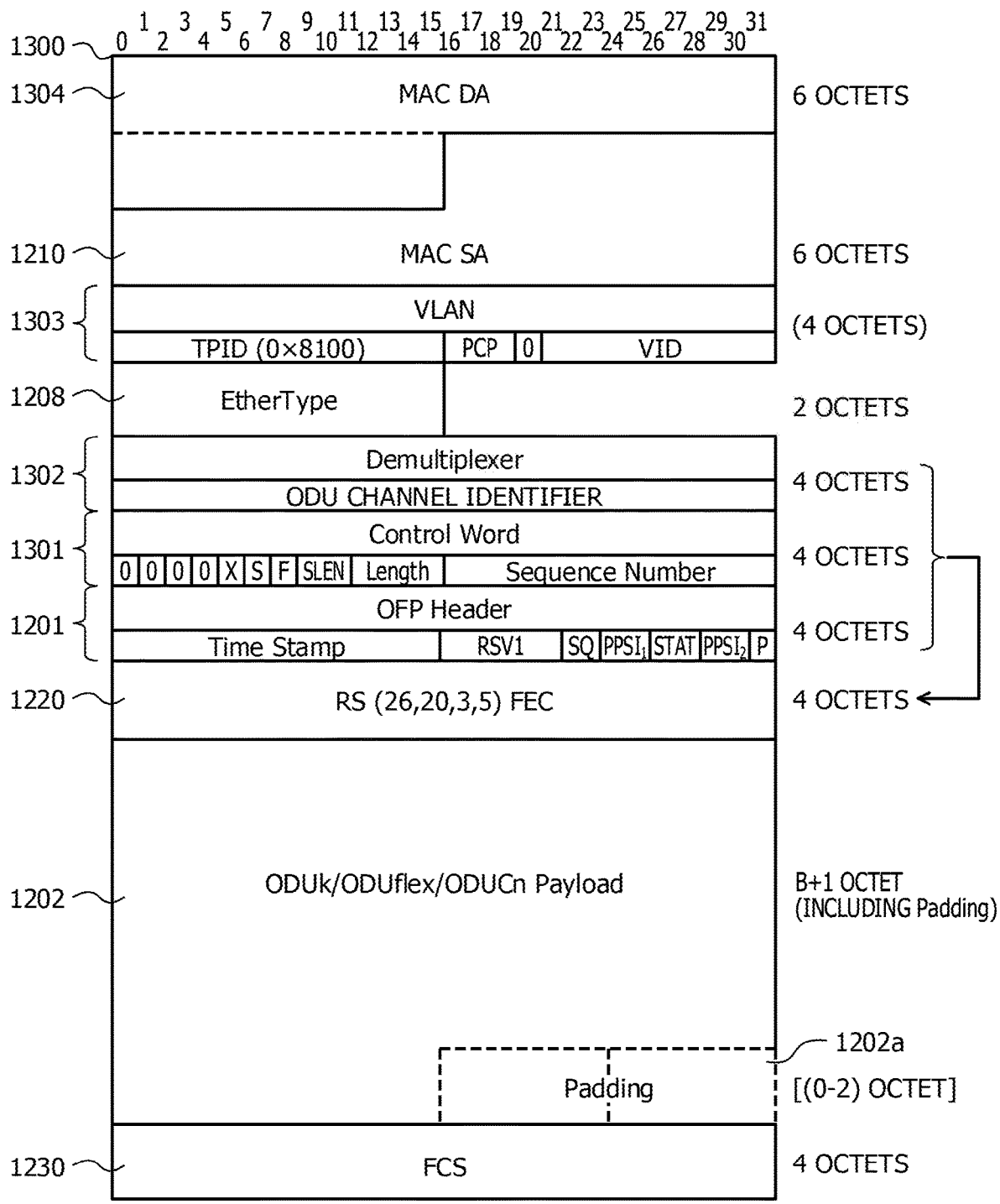
FIG. 13 is a diagram illustrating another example of the format of a transmission frame of the ODU segment according to the embodiment.

The transmission processing of the MAC layer by the PHY/MAC units 910 to 913 includes insertion of MAC DA and MAC SA, for example (see FIGS. 12 and 13, for example). SA stands for Source Address. DA stands for Destination address.

The insertion of the MAC DA is performed by, for example, referring to an ARP table and inserting a MAC address of each NextHop (packet switch) over the corresponding Ethernet interface into a MAC DA field. ARP stands for Address Resolution Protocol. The insertion of the MAC SA is performed by, for example, inserting its own MAC address of the Ethernet interface into a MAC SA field.

In addition, the transmission processing of the MAC layer by the PHY/MAC unit 910 to 913 includes insertion of the FCS for error monitoring to the Ethernet frame.

The egress processing of the FIC 810 illustrated in FIG. 8 includes processing of each of the PHY/MAC units 914 to 917, the parsers 918 to 921, the FEC decoder 923, the first header error detector 924, and the segment XOR calculator 925, for example. The egress processing of the FIC 810 illustrated in FIG. 8 also includes processing of each of the reorder buffer 926, the pacer/segment recovery unit 927, and the second header error detection/removal unit 928. In addition, the processing of the PHY/MAC unit 811 illustrated in FIG. 8 is implemented by the PHY/MAC units 914 to 917. Here, the case is described where the FIC 900 is applied to the FIC 810 illustrated in FIG. 8.

The PHY/MAC units 914 to 917 perform the reception processing of the physical layer and the MAC layer of the Ethernet signal (100GBASE-SR4/CR4, or the like) carrying the respective segments and the OAM frames received from the respective packet switches 221 to 224. The PHY/MAC units 914 to 917 output to the respective parsers 918 to 921 the respective segments and the OAM frames after the reception processing is performed.

The reception processing of the MAC layer by the PHY/MAC units 914 to 917 includes the FCS check on the Ethernet frames. Any Ethernet frame where the FCS error is detected is discarded (segment discarding), for example.

The parsers 918 to 921 output the segments received from the PHY/MAC units 914 to 917 to the FEC decoder 923. The parsers 918 to 921 also output to the OAM extraction/insertion unit 922 the OAM frames received from the PHY/MAC units 914 to 917. Distinction of the segments and the OAM frames by the parsers 918 to 921 is performed by, for example, referring to the MAC DA or EtherType field value of the received frame, for example.

The OAM extraction/insertion unit 922 extracts the OAM frames received from the parsers 918 to 921. The OAM frames include, for example, LLDP frames defined in IEEE 802.1AB and Ethernet OAM frames defined in the IEEE 802.1ag. IEEE stands for the Institute of Electrical and Electronics Engineers. LLDP stands for Link Layer Discovery Protocol. In addition, the OAM extraction/insertion unit 922 generates OAM frames such as the LLDP or the Ethernet OAM frames, and outputs the generated OAM frames to at least any of the strict priority controllers 906 to 909.

The FEC decoder 923 performs the error correction processing using the FEC code such as the RS code or the BCH code on the header fields of the respective segments received from the parsers 918 to 921. In addition, the FEC decoder 923 detects uncollectable error and discards the segment having uncorrected error. Then, the FEC decoder 923 outputs to the first header error detector 924 the respective segments on which the error correction processing is performed.

The respective segments outputted from the FEC decoder 923 to the first header error detector 924 includes the three consecutive ODU segments and the parity segment for the three consecutive ODU segments. The three consecutive ODU segments and the parity segment are the respective segments belonging to the same parity group.

The first header error detector 924 detects header errors (abnormal header contents) before the segment recovery processing on the header fields of the segment received from the FEC decoder 923 and discards the segment where the header error is detected. Then, the first header error detector 924 outputs to the segment XOR calculator 925 the respective segments for which no error is detected and which are not discarded.

The segment XOR calculator 925 writes the ODU segments received from the first header error detector 924 into a memory 926a used to store only the ODU segments for the segment reorder processing. In addition, the segment XOR calculator 925 performs bitwise XOR calculations over the every up to four segments belonging to the same parity group for every ODU channel (including both the ODU and the parity segments received from the first header error detector 924) in the order of arrival. Then, the segment XOR calculator 925 writes the resultant segment (XOR'd segment) obtained from the XOR calculation into a memory 926b used to store the temporal XOR'd segments whenever any segment is received from the first header error detector 924.

For example, the segment XOR calculator 925 identifies the ODU channel from the Demultiplexer of the respective segments. The segment XOR calculator 925 also identifies the parity group from the most significant 14 bits of the PWMCW sequence number (Sequence Number [16:29]) of the respective segments. The segment XOR calculator 925 also identifies a segment type (ODU or parity) from the least significant two bits of the PWMCW sequence number (Sequence Number [30:31]) of the respective segments.

An example of the bitwise XOR calculation by the segment XOR calculator 925 in the order of arrival for each parity group of the respective ODU channels is described herein. When the first segment in a parity group arrives, the segment XOR calculator 925 does not perform the bitwise XOR calculation and directly writes that segment as the XOR'd segment into the memory 926b. At this time, the XOR'd segment temporarily stored in the memory 926b for the parity group of the ODU channel is the first segment itself belonging to the parity group of the ODU channel.

When the second and subsequent segments in the parity group arrive, the segment XOR calculator 925 first reads out the XOR'd segment that is temporary written into the memory 926b. Then, the segment XOR calculator 925 writes a result of the bitwise XOR calculation of the arrived segment and the read XOR'd segment again into the memory 926b.

With this, when two ODU segments and a parity segment belonging to the identical parity group of the respective ODU channel arrive, the memory 926b stores the XOR'd segment which is as same as the remaining one ODU segment belonging to the parity group of the ODU channel. The XOR'd segment stored in the memory 926b is read out in place of the ODU segment which is discarded due to the error and not written into the memory 926a by the following pacer/segment recovery unit 927.

When the three ODU segments belonging to the identical parity group of the respective ODU channel arrive, the memory 926b stores the XOR'd segment which is as same as the parity segment. In this case, however, all of the ODU segments are successfully received and no segment recovery is needed. Thus, those parity segments stored in the memory 926b are not read out by the following pacer/segment recovery unit 927.

When all segments belonging to the identical parity group of the respective ODU channel (three ODU segments and a parity segment) arrive, the contents of the XOR'd segment stored in the memory 926b become all zeros. Also in this case, all of the ODU segments are successfully received and thus no segment recovery is needed. Thus, those kind of XOR'd segments stored in the memory 926b are not read out by the following pacer/segment recovery unit 927.

In addition, if the number of successfully received segments belonging to the identical parity group of the respective ODU channel is 2 or less, the XOR'd segment which does not make sense is stored in the memory 926b. In this case, since the segment recovery is not possible, those kind of XOR'd segments are not read out.

The reorder buffer 926 reorders the ODU segments into the order of the PWMCW sequence number (Sequence Number [16:31]) for each ODU channel.

By way of example, since the time stamp field (time Stamp [0:15]) of the OFP header can identify relative time up to 125 [μs], it is assumed that depth of the reorder buffer 926 is also 125 [μs].

The reorder buffer 926 consists of the memory 926a to store the ODU segments and the memory 926b to store the XOR'd segments. In addition, the memory 926a storing the ODU segment has one write port and one readout port so that writing from the segment XOR calculator 925 and reading from the pacer/segment recovery unit 927 are possible. The memory 926b storing the XOR'd segment has two readout ports and one write port so that the writing and the reading from the segment XOR calculator 925 and the reading from the pacer/segment recovery unit 927 are possible.

The pacer/segment recovery unit 927 (Pacer and Segment Recovery) performs pacer processing that reads out the ODU segments from the reorder buffer 926 at a fixed pace (speed) for every ODU channel. When the ODU segment to be read out next is successfully received, the pacer/segment recovery unit 927 reads out the ODU segment from the memory 926a. In addition, when the ODU segment to be read out next is not successfully received, the pacer/segment recovery unit 927 performs segment recovery processing that reads out the recovered segment from the memory 926b if the number of successfully received segments belonging to the identical parity group of the ODU channel is 3. Then, the pacer/segment recovery unit 927 outputs to the second header error detection/removal unit 928 the ODU segment read out through the pacer processing and the segment recovery processing.

The pacer processing during initialization by the pacer/segment recovery unit 927 is described herein. The initialization processing is required, for example, after cross-connect provisioning of the ODU channel, after occurrence of underflow or overflow of the reorder buffer 926, or the like. During initialization, the pacer/segment recovery unit 927 snoops the time stamp (Time Stamp [0:15]) of the OFP header of the first ODU segment to be read out for each ODU channel. Then, the pacer/segment recovery unit 927 performs the first readout at the time of the snooped time stamp value+Δ (register configurable value). Here, the time stamp value represents the time when the ODU segment is generated, and Δ corresponds to the maximum segment delay due to the packet processing in the apparatus.

For example, the pacer/segment recovery unit 927 generates reference time using a counter which counts the number of the reference clock cycles and is reset by the reference timing pulse. The count range of the counter may be 0 to 38879, for example. The reference clock and the reference timing pulse distributed to every line card are synchronized in the apparatus. The frequency of the reference clock may be, for example, 311.04 [MHz]. The pulse cycle of the reference timing pulse may be, for example, 125 [μs] or 250 [μs].

Next, the pacer processing by the pacer/segment recovery unit 927 after the initialization is described herein. The pacer/segment recovery unit 927 reads out the ODU segment for every T reference clock cycles. T is the register configurable value corresponding to the transmission interval of the ODU segments.

Actual readout by the pacer/segment recovery unit 927 may be delayed due to the congestion on the interface from OFP interface 901 to OTN framer 820. Thus, after the initialization processing is complete, the pacer/segment recovery unit 927 adds a token to the token counter for every T reference clock cycles, and issues a readout request to the segment recovery processing when the number of the token stored in the token counter is equal or greater than 1.

Next, details of the segment recovery processing by the pacer/segment recovery unit 927 is described herein. When the ODU segment to be read out next is successfully received, the pacer/segment recovery unit 927 reads out the ODU segment from the memory 926a of the reorder buffer 926 and decrements the token counter by 1.

If the ODU segment to be read out next is not successfully received, but the number of the successfully received segments belonging to the identical parity group is three, the recovered segment resulting from the bitwise XOR calculation of these three segments is retained in the memory 926b. In this case, the pacer/segment recovery unit 927 reads out the recovered ODU segment from the memory 926b and decrements the token counter by 1.

If the ODU segment to be read out next is not successfully received and the number of the successfully received segments belonging to the identical parity group is 2 or less, the recovery of the ODU segment to be read out next is not possible. In this case, the pacer/segment recovery unit 927 does not perform the readout and just decrements the token counter by 1. By the OTN framer 820, the payload part of the lost ODU segment, which is not read out because the segment recovery is not possible, may be compensated with dummy bytes. The length of the dummy bytes is B, B+1, or B−1 [Byte], for example, and can be derived from the PPSI field of the OFP header of the next ODU segment of the same ODU channel. PPSI stands for Previous Packet Size Indicator and used to preserve frame synchronization of the errored ODU channel.

The second header error detection/removal unit 928 detects further header errors (abnormal header contents) after the segment recovery processing on the header fields of the ODU segment received from the pacer/segment recovery unit 927. Then, the second header error detection/removal unit 928 discards the ODU segment where the header error is detected.

Then, the second header error detection/removal unit 928 removes the header fields inserted by the ingress FIC (header insertion unit 902) from the ODU segment where no error is detected and which is not discarded, and decapsulates the ODU (OFP) segment. For example, the second header error detection/removal unit 928 removes the Demultiplexer (PW label). Before the removal, the ODU channel is identified from the Demultiplexer and, for example, is mapped into the Channel Number [39:32] of the BCW of Interlaken by the following OFP interface 901.

In addition, the second header error detection/removal unit 928 removes the PWMCW, for example. Before the removal, the second header error detection/removal unit 928 also removes 0, 1, or 2 octets of padding following the ODU payload according to the SLEN [8:9] field of the PWMCW and decapsulates only the OFP header and the ODU payload. The second header error detection/removal unit 928 outputs the decapsulated ODU (OFP) segment consisting of the OFP header and the ODU payload to the OFP interface 901.

The OFP interface 901 outputs to the OTN framer 820 the ODU (OFP) segment received from the second header error detection/removal unit 928 after the necessary processing to transfer packets over an interface such as Interlaken. By way of example, the OFP interface 901 sets the Channel Number [39:32] field of the BCW (Control[63]=1, Type[62]=1) of the Interlaken for every ODU channel.

For example, if the header fields such as the Demultiplexer or the PWMCW sequence number is errored, recovery of a lost segment is not possible and such a header error may cause wrong restoration which may adversely affect the other normal ODU channels. In order to mitigate the risk of service disruption due to such header errors, as illustrated in FIG. 9 and as described above, the FEC code is appended so that errors on the header fields can be corrected and header errors (abnormal header contents) are carefully checked to improve the error detection probability so that the errored segment is discarded first and then is recovered with using the other three normal segments belonging to the same parity group of the ODU channel as possible.

(Pacer Processing by Pacer/Segment Recovery Unit According to Embodiment)

Figure 10:
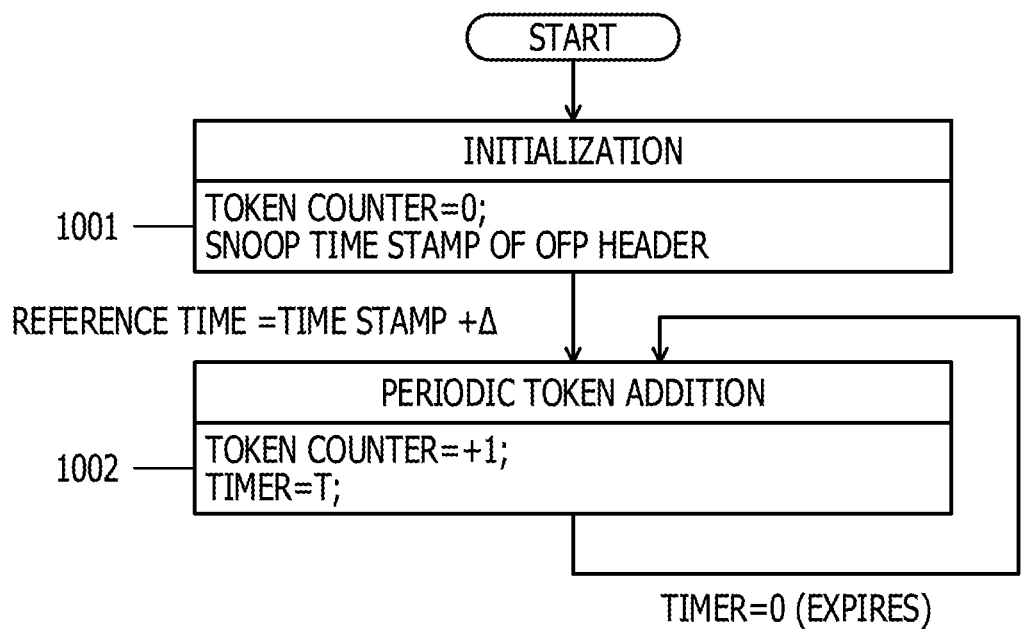
FIG. 10 is a state diagram illustrating an example of pacer processing by a pacer/segment recovery unit according to the embodiment.

FIG. 10 is a state diagram illustrating an example of the pacer processing by the pacer/segment recovery unit according to the embodiment. The pacer/segment recovery unit 927 illustrated in FIG. 9 performs the afore-mentioned pacer processing with using the state machine illustrated in FIG. 10, for example.

First, the pacer/segment recovery unit 927 proceeds to initialization state 1001 after the cross-connect provisioning of the ODU channel or the occurrence of the underflow or the overflow of the reorder buffer 926, for example. Upon entering the initialization state 1001, the pacer/segment recovery unit 927 resets the token counter to "0". In addition, in the initialization state 1001, the pacer/segment recovery unit 927 snoops the time stamp (Time Stamp [0:15]) of the OFP header of the first ODU segment to be read out for each ODU channel. Here, the time stamp is inserted by the ingress segmentation processing at the OTN framer 620 with using the reference clock and the reference timing pulse distributed to every line cards for time synchronization, and represents the time when the ODU (OFP) segment is generated.

As aforementioned, the pacer/segment recovery unit 927 generates reference time using a counter which counts the number of the reference clock cycles and is reset by the reference timing pulse. The pacer/segment recovery unit 927 enters periodic token addition state 1002 when the reference time is equal to the snooped time stamp value+A, where A is a register configurable predetermined value corresponding to the maximum segment delay due to the packet processing in the apparatus.

Upon entering the periodic token addition state 1002, the pacer/segment recovery unit 927 increments the token counter by one (=+1). The pacer/segment recovery unit 927 also resets a timer that counts the number of the reference clock cycles to T (TIMER=T), where T is a register configurable predetermined value) corresponding to the segment generation interval in the reference clock cycles. For example, this timer is a decrement counter that decrements by one on each reference clock cycle.

As aforementioned, the pacer/segment recovery unit 927 issues a readout request to the segment recovery processing when the number of the token stored in the token counter is equal or greater than 1. Then, the pacer/segment recovery unit 927 reenters the periodic token addition state 1002 again when the timer is expired (TIMER=0), andincrements the token counter by one and resets the timer to T again.

(Segment Recovery Processing by Pacer/Segment Recovery Unit According to Embodiment)

Figure 11:
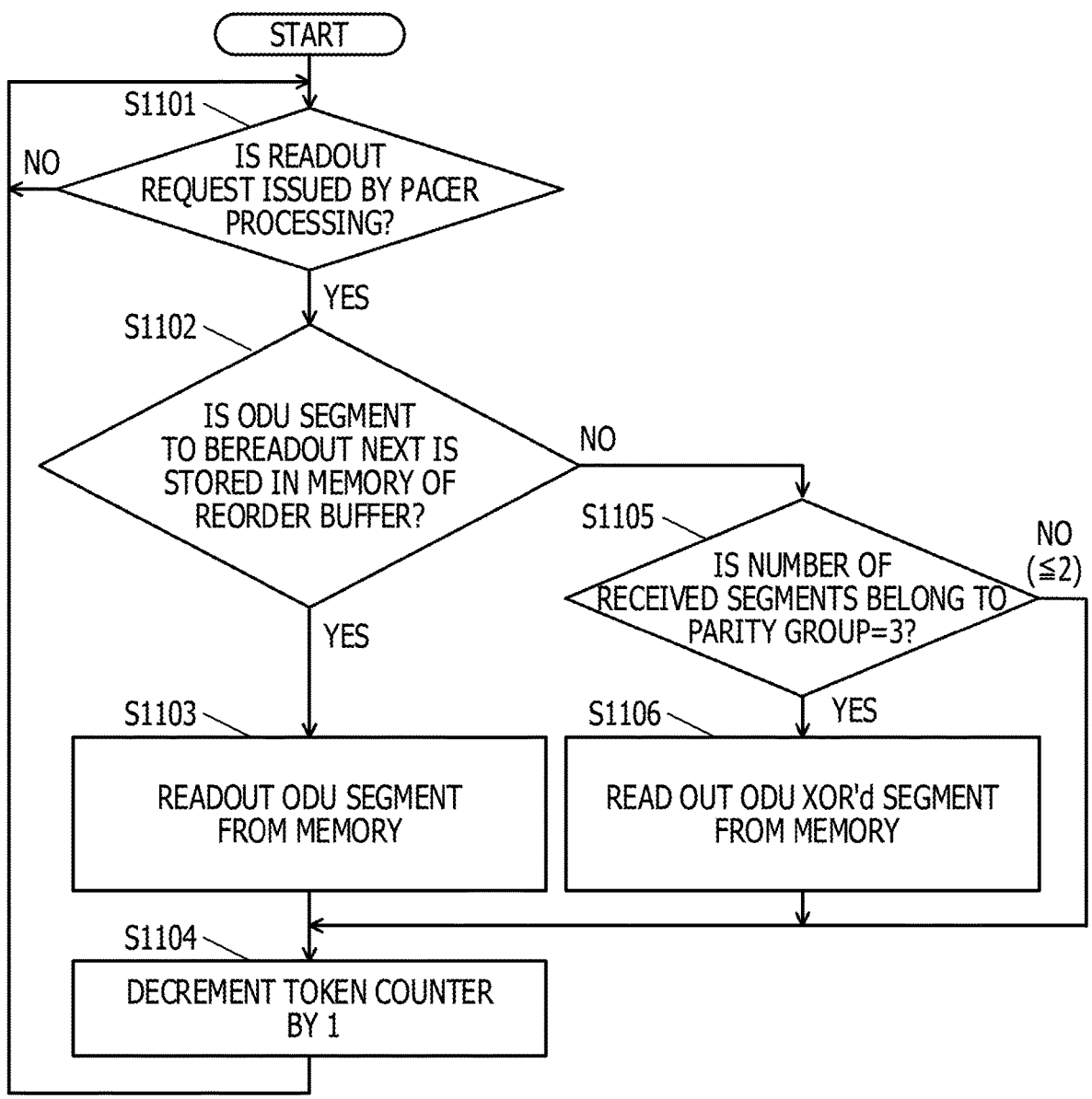
FIG. 11 is a flow chart illustrating an example of segment recovery processing by the pacer/segment recovery unit according to the embodiment.

FIG. 11 is a flow chart illustrating an example of the segment recovery processing by the pacer/segment recovery unit 927 according to the embodiment. The pacer/segment recovery unit 927 illustrated in FIG. 9 performs the respective step illustrated in FIG. 11, for example.

The pacer/segment recovery unit 927 determines whether or not a readout request is issued by the pacer processing as illustrated in FIG. 10 (step S1101), and waits until the readout request is issued (step S1101: No loop). When the readout request is issued (step S1101: Yes), the pacer/segment recovery unit 927 proceeds to step S1102. For example, the pacer/segment recovery unit 927 determines whether or not the ODU segment to be read out next is stored in the memory 926a of the reorder buffer 926 (step S1102).

In step S1102, if the ODU segment to be read out next is ready in the memory 926a (step S1102: Yes), the pacer/segment recovery unit 927, for example, reads out the ODU segment from the memory 926a (step S1103), decrements the token counter by 1 (step S1104), and returns to the step S1101.

In step S1102, if the ODU segment to be read out next is not ready in the memory 926a (step S1102: No), the pacer/segment recovery unit 927 determines whether or not the number of received segments belonging to the parity group to which the ODU segment to be read out belongs is 3 (step S1105). It may be worth noting that the number of received segments belonging to the parity group to which the ODU segment that is to be read out next but is not ready in the memory 926a belongs is 3 or less, since the ODU segment to be read out next is discarded.

In step S1105, if the number of received segments belonging to the parity group is 3 (step S1105: Yes), the pacer/segment recovery unit 927 reads out the XOR'd segment from the memory 926b of the reorder buffer 926 (step S1106), decrements the token counter by 1 (step S1104), and returns to the step S1101. It may be worth noting that the XOR'd segment stored in the memory 926b is identical to the lost ODU segment to be read out next, since the lost ODU segment can be recovered by the bitwise XOR calculation over the other two ODU segments and the parity segment belonging to the parity group for the case where the number of received segments belonging to the parity group is 3.

In step S1105, if the number of received segments belonging to the parity group is not 3 (step S1105: No), the pacer/segment recovery unit 927 decrements the token counter by 1 (step S1104) without any readout and returns to the step S1101. It may be worth noting that the XOR'd segment stored in the memory 926b for the parity group doesn't make sense for the case where the number of received segments belonging to the parity group is 2 or less (≤2).

(Transmission Format of ODU Segment According to Embodiment)

FIG. 12 is a diagram illustrating an example of the transmission format of the ODU segment according to the embodiment. Ethernet frame 1200 illustrated in FIG. 12 may be used for the transmission of the ODU and the parity segment between the ingress line cards 211 to 21i and the egress line cards 231 to 23j. The ODU/parity segment 1200 illustrated in FIG. 12 is based on PWE3/MPLS and may be used for a case where the packet switches 221 to 224 are MPLS capable (P router).

For example, the ODU/parity segment 1200 includes an OFP segment consisting of an OFP header 1201 and an ODU payload 1202. The ODU/parity segment 1200 also includes PWE3/MPLS headers such as a P2P/P2MP tunnel label 1207, an ELI 1205, an Entropy label 1206, Demultiplexer (PW label) 1204 and an ODU PW MPLS Control Word (ODU PWMCW) 1203. The ODU/parity segment 1200 also include MAC headers consisting of a destination address (MAC DA) 1209, a source address (MAC SA) 1210, an EtherType 1208, and an FCS 1230. The ODU/parity segment 1200 may also include an FEC code 1220 such as RS(26,20,3,5).

The ODU (OFP) segment which is passed between the OFP interface 901 and the header insertion unit 902 or the second header error detection/removal unit 928 consists of the OFP header 1201 and the ODU payload (ODUk/ODUflex/ODUCn Payload) area 1202. The ODU payload area 1202 carries the segmented data bytes of the ODUk, ODUflex, or ODUCn payload. ODUk stands for Optical-channel Data Unit-k. ODUflex stands for Optical-channel Data Unit-flex. ODUCn stands for Optical-channel Data Unit 100G×n.

For example, the header insertion unit 902 inserts the ODU PWMCW 1203. The ODU PWMCW 1203 consists of the PWMCW identifier (0000[0:3]), the flags (X[4], S[5] and F[6:7]), the segment length (SLEN [8:9]), and the sequence number (Sequence Number [16:31]) fields. The segment length (SLEN [8:9]) represents the length of the ODU payload 1202.

Since the ODU (OFP) segment is generated by segmenting the constant bit rate (CBR) ODU signal, the length of the ODU payload area 1202 is varied in the range from B−1 to B+1 octets, depending on the frequency distortion of the ODU signal from the nominal. Since the length of the ODU/parity segment for each ODU channel needs to be fixed for the segment recovery processing, the header insertion unit 902 appends 0 to 2 padding octets 1202a to the ODU payload 1202 so that the total length of the ODU payload 1202 and the padding 1201a area is fixed to B+1 octets. The length of the padding 1202a appended is derived from the segment length (SLEN [8:9]), that is, no padding for SLEN [8:9]=B+1 [octets], 1 padding octet for SLEN [8:9]=B [octets], and 2 padding octets for SLEN [8:9]=B−1 [octets].

The header insertion unit 902 sets the least significant 2 bits of the sequence number (Sequence Number [30:31]) to "00", "01", or "10" for the ODU segment, and thus the parity segment generator 903 sets those bits to "11" for the parity segment.

The header insertion unit 902 also inserts a Demultiplexer (PW label) 1204. The Demultiplexer (PW label) 1204 identifies individual PW and thus individual ODU channel carried in each LSP tunnel. LSP stands for Label Switched Path.

The header insertion unit 902 may also insert the ELI 1205 and the Entropy label 1206 for load sharing over equal cost multi paths (ECMP) or link aggregation group (LAG), in accordance with the register configuration.

The header insertion unit 902 also inserts, for example, the P2P/P2MP tunnel label 1207. The P2P/P2MP tunnel label 1207 is an MPLS label designating the LSP to the destination peer of the PW which encapsulates the ODU (OFP) segment.

While the transmission format of the ODU segment is described, the transmission format of the parity segment is similar to the transmission format of the ODU segment. For example, the OFP header 1201, the ODU payload 1202 (including the padding 1202*a*), and all or a part of fields of the ODU PWMCW 1203 such as SLEN [8:9] for the parity segment are generated by the bitwise XOR calculation of the three ODU segments belonging to the same parity group (See FIG. 14, for example).

For example, if the afore-mentioned M is set to $M=2^m-1$ (m=2, 3, 4, . . . ), the Sequence Number for the parity segment can also be generated by the bitwise XOR calculation of the Sequence Numbers of the three ODU segments belonging to the same parity group. Note that any fields except for SLEN [8:9] of the ODU PWMCW 1203 for the parity segment can also be generated in the same manner for the ODU segment. In addition, the MPLS labels set to the other header fields for the parity segment are as same as those for the ODU segment.

The FEC encoder 904 illustrated in FIG. 9 inserts, for example, the FEC code 1220 calculated over the Demultiplexer 1204, ODU PWMCW 1203, and the OFP header 1201. By way of example, an RS code (RS (26, 20, 3, 5) FEC) having a code symbol length n=26, an information symbol length k=20, an error correctable symbol count t=3, and a symbol length m=5 [bit] may be used for the FEC code 1220. Since the parity bit of the RS (26, 20, 3, 5) code is 30 [bit]=5·(26-20), a two-bit padding is appended to the FEC code 1220.

The MAC DA 1209, the MAC SA 1210, and the EtherType 1208 is inserted by either the header insertion unit 902 or the PHY/MAC units 910 to 913. For the PWE3/MPLS based format illustrated in FIG. 12, the EtherType 1208 is set to 0x8847.

Each of the PHY/MAC units 910 to 913 illustrated in FIG. 9 inserts FCS 1230 for the error monitoring over the Ethernet link between line cards and switches.

FIG. 13 is a diagram illustrating another example of the transmission format of the ODU segment according to the embodiment. For example, an Ethernet frame 1300 illustrated in FIG. 13 may be used for the transmission of the ODU and the parity segment between the ingress line cards 211 to 21*i* and the egress line cards 231 to 23*j*. The ODU/parity segment 1300 illustrated in FIG. 13 is a MAC frame and may be used for a case where the packet switches 221 to 224 are L2 switches (MAC bridges). According to the embodiment, since the ingress line card can distribute the segments statically towards packet switches 221 to 224, irrespective of reachability to the egress destination line card via the respective packet switches 221 to 224, L2 switches which bridge the segment based on the MAC DA lookup without any routing protocol capabilities or the like can also be used for the packet switches 221 to 224 of the apparatus.

Regarding the alternative format illustrated in FIG. 13, the header insertion unit 902 inserts a CW 1301 (Control Word) similar to the PWMCW 1203 illustrated in FIG. 12, and a Demultiplexer 1302 identifying individual ODU channel like the Demultiplexer 1204 illustrated in FIG. 12. Note that the Demultiplexer 1302 illustrated in FIG. 13 may not follow a shim header format such as the Demultiplexer 1204 illustrated in FIG. 12.

In addition, the header insertion unit 902 inserts the MAC destination address 1209 (MAC DA) and the MAC source address 1210 (MAC SA). The MAC DA 1209 is a MAC address representing egress destination line cards (any of the line cards 231 to 23*j*, for example) to which the segments of the ODU channel are sent, and may be a unicast or multicast address. The MAC SA 1210 is a MAC address of the ingress line cards from which the segments of the ODU channel are sent.

The header insertion unit 902 inserts the EtherType 1208, and may insert an optional VLAN label 1303 in accordance with the register configuration.

(Calculation of Horizontal Parities According to Embodiment)

FIG. 14 is a diagram illustrating an example of calculation of the horizontal parities according to the embodiment. FIG. 14 describes a case where the PWE3/MPLS based format is used (see FIG. 12). In FIG. 14, identical symbols are assigned to parts similar to the parts illustrated in FIG. 12, and an explanation of the parts is omitted. Segments 1400 (#1 to #3) illustrated in FIG. 14 are each a part of the three consecutive ODU segments. The segment 1400 (#4) illustrated in FIG. 14 is a part of the parity segments calculated over the segments 1400 (#1 to #3). That is, the segments 1400 (#1 to #4) are the segments belonging to the same parity group of an ODU channel.

The OFP headers 1201 (#1 to #4) are the OFP headers 1201 in the segments 1400 (#1 to #4), respectively. The ODU payloads 1202 (#1 to #4) are the ODU payloads 1202 in the segments 1400 (#1 to #4), respectively. The paddings 1202*a* (#1 to #4) are the paddings 1202*a* in the segments 1400 (#1 to #4), respectively.

The PWMCW 1203 (#1 to #4) are the PWMCW 1203 in the segments 1400 (#1 to #4), respectively. The PWMCW identifiers 1203*a* (#1 to #4) are the PWMCW identifiers (0000 [0:3]) of the PWMCW 1203 in the segments 1400 (#1 to #4), respectively. Flags (X[4], S[5] and F[6:7]) 1203*b* (#1 to #4) are the flags (X[4], S[5] and F[6:7]) of the PWMCW 1203 in the segments 1400 (#1 to #4), respectively. Segment lengths (SLEN [8:9]) 1203*c* (#1 to #4) are the segment lengths (SLEN [8:9]) of the PWMCW 1203 in the segments 1400 (#1 to #4), respectively. Lengths (LEN [10:15]) 1203*d* (#1 to #4) are the lengths (Length [10:15]) of the PWMCW 1203 in the segments 1400 (#1 to #4), respectively. Sequence numbers (SQ [16:31]) 1203*e* (#1 to #4) are the sequence numbers (Sequence Number [16:31]) of the PWMCW 1203 in the segments 1400 (#1 to #4), respectively.

First, as described above, since the segments 1400 (#1 to #4) are the segments belonging to the same parity group of an ODU channel, the values set to the Demultiplexer 1204 (#1 to #4) fields of the segments 1400 (#1 to #4) need to be identical. Similarly, the values set to the most significant 14 bits [16:29] of the sequence numbers 1203*e* (#1 to #4) of the segments 1400 (#1 to #4) also need to be identical. In addition, as described above, the values set to the least significant 2 bits [30:31] of the sequence numbers 1203*e* (#1 to #4) of the segments 1400 (#1 to #4) need to be set to 00, 01, 10, and 11, respectively.

Next, the PWMCW identifier 1203*a* must be set to "0000" as per the rule for the generic PWMCW described in [RFC4385]. In addition, since the segments 1400 (#1 to #4) are the segments of the same ODU channel, the values set to the flag 1203*b* (#1 to #4) fields of the segments (#1 to #4) need to be identical, and are typically set to a fixed or an register configurable static value. Similarly, the values set to the length 1203*d* (#1 to #4) fields of the segments (#1 to #4) need to be identical, and are typically set to all zeros ("000000") as per the rules for the preferred PWMCW described in [RFC4385], since the entire segment length is, in general, not less than 64 bytes.

On the other hand, the segment length 1203c (#4) of the parity segment needs to be derived through the bitwise XOR calculation of the segment lengths 1203c (#1 to #3) of the ODU segments. Similarly, the OFP header (Parity) 1201 (#4) of the parity segment needs to be derived through the bitwise XOR calculation of the OFP headers 1201 (#1 to #3) of the ODU segments. The ODU payload (Parity) 1202 (#4) of the parity segment needs to be derived through the bitwise XOR calculation of the ODU payloads 1202 (#1 to #3) of the ODU segments. The padding (Parity) 1202a (#4) of the parity segment needs to be derived though the bitwise XOR calculation of the paddings 1202a (#1 to #3) of the ODU segments.

That is, the fields of the segments over which the horizontal parities are calculated and which should be protected by the segment recovery processing using the horizontal parities are generally the segment length 1203c in the PWMCW 1203 header, the ODU payload 1202 and the padding 1202a fields. The MPLS labels (1207, 1205, 1206, 1204), the MAC headers (1209, 1210, 1208, 1230), and the FEC code (1220) are out of scope of the horizontal parity calculation and the segment recovery processing. Similarly, the PWMCW identifier 1203a, the flag 1203b, the length 1203d, and the sequence number 1203e fields of the PWMCW header are, in general, out of scope of them.

However, if the afore-mentioned M is set to $M=2^m-1$ (m=2, 3, 4, . . . ), the entire PWMCW 1203 (#4) including the sequence number 1203e (#4) of the parity segment matches the result of the bitwise XOR calculation of the PWMCW 1203 (#1 to #3) of the ODU segments, as described below in detail. That is, in this case, the fields of the parity segment which can be derived through the horizontal parity calculation can be the entire PWMCW 1203 header, the ODU payload 1202 the padding 1202a fields.

For example, while every the PWMCW identifier 1203a field needs to be set to the fixed value of "0000", the PWMCW identifier 1203a (#4) of the parity segment can be set to "0000" through the bitwise XOR calculation of the fixed values of "0000" in the PWMCW identifiers 1203a (#1 to #3) of the ODU segments, as illustrated in FIG. 14, since "0 XOR 0 XOR 0" equals to 0.

While every the flag 1203b field needs to be set to the register configurable identical value of "XSF", the flag 1203b (#4) of the parity segment can be set to the identical value of "XSF" through the bitwise XOR calculation of the identical values of "XSF" in the flags 1203b (#1 to #3) of the ODU segments, as illustrated in FIG. 14, since "0 XOR 0 XOR 0" equals to 0 for any bit in "XSF" set to 0 and "1 XOR 1 XOR 1" equals to 1 for any bit in "XSF" set to 1.

As mentioned before, the segment length 1203c (#4) of the parity segment needs to be derived through the bitwise XOR calculation of the segment lengths 1203c of the ODU segments. In FIG. 14, each of symbols "p" through "w" represents a single bit binary number and is set to either 0 or 1. Since each of the single bit binary values "p" through "u" in the segment lengths 1203c (#1 to #3) of the ODU segments is independently set to either 0 or 1, the single bit binary values "v" and "w" in the segment length 1203c (#4) of the parity segment are calculated as "p XOR r XOR t" equals to "v" and "q XOR s XOR u" equals to "w", respectively.

While every the length 1203d field needs to be set to the fixed value of "000000", the length 1203d (#4) of the parity segment can be set to "000000" through the bitwise XOR calculation of the fixed values of "000000" in the lengths 1203d (#1 to #3) of the ODU segments, as illustrated in FIG. 14, since "0 XOR 0 XOR 0" equals to 0.

The sequence number 1203e (#4) of the parity segment can also be derived through the bitwise XOR calculation of the sequence numbers 1203e (#1 to #3) of the ODU segments. Regarding the most significant 14 bits of the sequence number 1203e (SQ[16:29]), while the SQ[16:29] fields of the segments belonging to the same parity group of each ODU channel need to be set to the identical value of "abcdefghijklmn" as illustrated in FIG. 14, the SQ[16:29] of the sequence number 1203e (#4) of the parity segment can be set to the identical value of "abcdefghijklmn" though the bitwise XOR calculation, since "0 XOR 0 XOR 0" equals to 0 for any bit in "abcdefghijklmn" set to 0 and "1 XOR 1 XOR 1" equals to 1 for any bit in "abcdefghijklmn" set to 1. In addition, regarding the least significant 2 bits of the sequence numbers 1203e (SQ[30:31]), while the SQ[30:31] fields of the ODU segments #1 to #3 and the parity segment #4 belonging to the same parity group of each ODU channel need to be set to "00", "01", "10", and "11", respectively, as also illustrated in FIG. 14, the SQ[30:31] of the sequence number 1203e (#4) of the parity segment can be set to "11" though the bitwise XOR calculation, since "00 XOR 01 XOR 10" equals to "11".

(Segments According to Embodiment)

FIG. 15 is a diagram illustrating an example of segments according to the embodiment. The header insertion unit 902 illustrated in FIG. 9 generates the ODU segments 1500 to 1502 (0-0 to 0-2), 1510 to 1512 (1-0 to 1-2), 1520 to 1522 (2-0-2-2), and 1530 to 1532 (3-0 to 3-2) illustrated in FIG. 15. In an example illustrated in FIG. 15, the length of each segment is 8 bytes and each segment is depicted by 8 rows per byte (8 bits).

The parity segment generator 903 illustrated in FIG. 9 generates the parity segment 1503 (0-P) by the bitwise XOR calculation over the ODU segments 1500 to 1502 (0-0 to 0-2). The parity segment generator 903 also generates the parity segment 1513 (1-P) by the bitwise XOR calculation over the ODU segments 1510 to 1512 (1-0 to 1-2).

The parity segment generator 903 generates the parity segment 1523 (2-P) by the bitwise XOR calculation over the ODU segments 1520 to 1522 (2-0 to 2-2). The parity segment generator 903 generates the parity segment 1533 (3-P) by the bitwise XOR calculation over the ODU segments 1530 to 1532 (3-0 to 3-2).

The ingress line card 211 first distributes the ODU segments 1500 to 1502 (0-0 to 0-2) and the parity segment 1503 (0-P) to the packet switches 221 to 224, respectively. Next, the ingress line card 211 distributes the ODU segments 1510 to 1512 (1-0 to 1-2) and the parity segment 1513 (1-P) to the packet switches 221 to 224, respectively.

Then, the ingress line card 211 distributes the ODU segments 1520 to 1522 (2-0 to 2-2) and the parity segment 1523 (2-P) to the packet switches 221 to 224, respectively. The ingress line card 211 distributes the ODU segments 1530 to 1532 (3-0 to 3-2) and the parity segment 1533 (3-P) to each of the packet switches 221 to 224, respectively.

(Bit Errors in Segments According to Embodiment)

FIG. 16 is a diagram illustrating an example of bit errors occurred in the segments according to the embodiment. In FIG. 16, identical symbols are assigned to parts similar to the parts illustrated in FIG. 15, and an explanation of the parts is omitted. It is assumed that the bit errors occur in bytes 1601 to 1604 of the respective segments illustrated in FIG. 15.

The bit errors occur, for example, on the links between the ingress line card 211 and the packet switches 221 to 224, inside the packet switches 221 to 224, or on the links between the packet switches 221 to 224 and the egress line card 231.

The byte 1601 is the fourth byte of the ODU segment 1500. Although the byte 1601 is originally "11000110", it becomes "10000110" due to the bit error (the second bit is inverted). The byte 1602 is the fifth byte of the ODU segment 1512. Although the byte 1602 is originally "11101001", it becomes "11101011" due to the bit error (the seventh bit is inverted).

The byte 1603 is the third byte of the parity segment 1523. Although the byte 1603 is originally "10000011", it becomes "10000111" due to the bit error (the sixth bit is inverted). The byte 1604 is the eighth byte of the ODU segment 1531. Although the byte 1604 is originally "01001011", it becomes "01101011" due to the bit error (the third bit is inverted).

In such a case, the ODU segments 1500, 1512, 1531 and the parity segment 1523 including the errored bytes 1601 to 1604 are discarded by the packet switches 221 to 224 or the egress line card 231.

(Recovery of Discarded Segments According to Embodiment)

FIG. 17 is a diagram illustrating an example of recovery of the discarded segments according to the embodiment. In FIG. 17, identical symbols are assigned to parts similar to the parts illustrated in FIGS. 15 and 16, and an explanation of the parts is omitted. As illustrated in FIG. 17, the egress line card 231 can recover, for example, the original ODU segment 1500 by the bitwise XOR calculation over the ODU segments 1501, 1502, and the parity segment 1503.

The egress line card 231 can also recover the original ODU segment 1512 by the bitwise XOR calculation over the ODU segments 1510, 1511 and the parity segment 1513. The egress line card 231 can also recover the original parity segment 1523 by the bitwise XOR calculation over the ODU segments 1520 to 1522.

The egress line card 231 can also recover the original ODU segment 1531 by the bitwise XOR calculation over the ODU segments 1530, 1532, and the parity segment 1533. These allow the line card 231 to get every the original ODU segments including the discarded ODU segments 1500, 1512, and 1531. Note that the line card 231 does not need to recover the parity segment 1523 because it is not an ODU segment.

(Hardware Configuration of Cross-connect Apparatus According to Embodiment)

Figure 18:
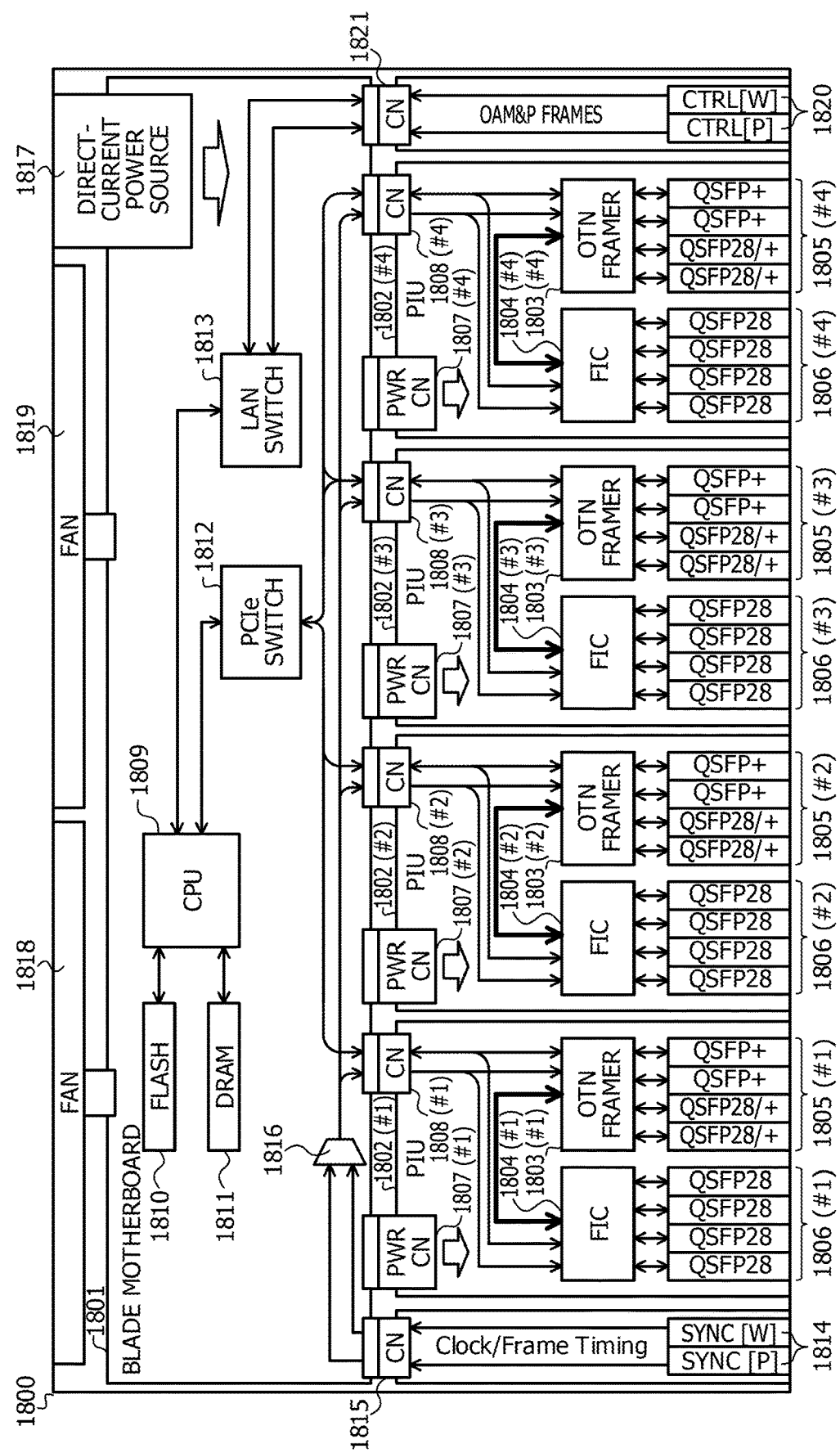
FIG. 18 is a diagram illustrating an example of a hardware configuration of the cross-connect apparatus according to the embodiment.

FIG. 18 is a diagram illustrating an example of the hardware configuration of the cross-connect apparatus according to the embodiment. The cross-connect apparatus 200 illustrated in FIG. 2 may be implemented by the cross-connect apparatus 1800 illustrated in FIG. 18, for example. An example illustrated in FIG. 18, however, assumes a case where the cross-connect apparatus 1800 does not include the packet switches 221 to 224 and utilizes the external commodity packet switches 221 to 224.

As illustrated in FIG. 18, the cross-connect apparatus 1800 includes a blade motherboard 1801, PIUs 1802 (#1 to #4), a CPU 1809, a flash memory 1810, a DRAM 1811, a PCIe switch 1812, and a LAN switch 1813. The cross-connect apparatus 1800 also includes a synchronization signal generator 1814, a connector 1815, and a selector 1816. The cross-connect apparatus 1800 also includes a direct-current (DC) power unit 1817, fans 1818 to 1819, a management interface 1820, and a connector 1821.

CPU stands for Central Processing Unit. DRAM stands for Dynamic Random Access Memory. LAN stands for Local Area Network. PCIe stands for Peripheral Component Interconnect Express.

The blade motherboard 1801 is a chassis that accommodates four PIUs 1802 (#1 to #4). Each of the PIUs 1802 (#1 to #4) corresponds to both the ingress line card 211, 212, or 21i and the egress line card 231, 232, or 23j illustrated in FIG. 2. Each PIU 1802 (#1 to #4) consists of an OTN framer 1803 (#1 to #4), a FIC 1804 (#1 to #4), line interface modules 1805 (#1 to #4), and fabric interface modules 1806 (#1 to #4). Each PIU 1802 (#1 to #4) also has a power connector 1807 (#1 to #4) and a connector 1808 (#1 to #4) for the synchronization and the management.

The OTN framer 1803 (#1 to #4) is a component corresponding to both the ingress OTN framer 620 and the egress OTN framer 820 illustrated in FIGS. 6 and 8, respectively. The FIC 1804 (#1 to #4) is a component corresponding to both the ingress FIC 630 and the egress FIC 810 illustrated in FIGS. 6 and 8, respectively. The line interface modules 1805 (#1 to #4) correspond to both the ingress line interface modules 611 to 614 and the egress line interface modules 831 to 834 illustrated in FIGS. 6 and 8, respectively, and may be two QSFP28/QSFP+compatible modules and two QSFP+modules, for example. The fabric interface modules 1806 (#1 to #4) are modules to interface with the packet switches 221 to 224 and correspond to arrows from the ingress FIC 630 and to the egress FIC 810 illustrated in FIGS. 6 and 8, respectively, and may be the QSFP28 modules, for example.

For example, the afore-mentioned ingress line card 211 may be a part of the PIU 1802 (#1) and the afore-mentioned egress line card 231 may be a part of the PIU 1802 (#3). In this case, an ODU channel carrying a signal received by one of the line interface modules 1805 (#1) on the PIU 1802 (#1) is segmented by the OTN framer 1803 (#1), and distributed by the FIC 1804 (#1) through the fabric interface modules 1806 (#1).

Segments transmitted from the fabric interface module 1806 (#1) are transferred to the PIU 1802 (#3) by the packet switches 221 to 224. Segments transferred to the PIU 1802 (#3) are received by the line interface modules 1806 (#3), recovered and reordered by the FIC 1804 (#3), reassembled by the OTN framer 1803 (#3) and transmitted by one of the line interface modules 1805 (#3).

The power connectors 1807 (#1 to #4) are used to supply DC power from the DC power unit 1817 to the PIUs 1802 (#1 to #4), respectively. The connectors 1808 (#1 to #4) are used to connect signals for the PIU management between each of PIUs 1808 (#1 to #4) and the PCIe switch 1812 and signals for the system synchronization between each of PIUs 1808 (#1 to #4) and the selector 1816, respectively.

In addition, a CPU 1809 and memories or the like such as flash memory 1810 and DRAM 1811 on the blade motherboard 1801 are used for the management of the PIUs 1802 (#1 to #4). For example, the CPU 1809 monitors and controls the PIUs 1802 (#1 to #4) through a PCIe bus via the PCIe switch 1812. The PIU management includes provisioning, controls and monitoring control of the OTN framer 1803 (#1 to #4), the FIC 1804 (#1 to #4), and so on. The CPU 1809 also communicates OAM & P frames with redundant external controllers (CTRL[W] and CTRL[P]) via the LAN switch 1813. OAM & P stands for operations, administration, maintenance, and provisioning The synchronization signal generator 1814 (SYNC) generates the reference clock (Clock) and the reference timing pulse (Frame Timing) as afore-mentioned. The reference clock and the reference timing pulse are used to emulate the cross connection of the circuits using the packet switches 221 to 224 as described in the OIF OFP implementation agreement. The synchronization signal generator 1814 outputs the generated reference clocks and reference timing pulses to the selector 1816 via the connector 1815.

The synchronization signal generator 1814 generates two sets of the reference clock and the reference timing pulse signals synchronized to redundant external clock and timing references (SYNC[W]) and SYNC[P]), respectively. The selector 1816 selects either the working set (SYNC[W]) or the protection set (SYNC[P]), and distributes the selected set of the reference clock and the reference timing pulse to the PIUs 1802 (#1 to #4).

The DC power unit 1817 supplies the DC power to each component on the blade motherboard 1801 and the PIUs 1802 (#1 to #4). The direct-current power unit 1817 may include DC/DC converters to supply various DC voltages. The redundant fans 1818 and 1819 are used for the forced cooling of the cross-connect apparatus 1800.

The management interface 1820 communicates OAM & P frames with the redundant external controllers (CTRL[W] and CTRL[P]) such as EMSs, NMSs, or the like. Then, the management interface 1820 interfaces the OAM & P frames with the CPU 1809 via the connector 1821 and the LAN switch 1813. EMS stands for Element Management System. NMS stands for Network Management System.

In this manner, according to the cross-connect apparatus 200, for every three (M) consecutive ODU segments obtained by the segmentation of an ODU signal inputted to, for example, the line card 211, the three ODU segments and a parity segment calculated over the three ODU segments can be distributed to the packet switches 221 to 224. This allows the line card 231, for example, to restore and output the ODU signal inputted to the line card 211 using at least three of four segments consisting of the three ODU segments and the parity segment transferred by the packet switches 221 to 224.

Even if any one of the three ODU segments is not successfully received by the line card 231 due to the fault or the error in the apparatus, for example, it is possible to recover the lost segment through the bitwise XOR calculation over the remaining three segments and restore the ODU signal.

Compared with the redundant configuration of 1+1, for example, the total switching capacity and the total link bandwidth are less, thus being advantageous in terms of the cost and the power consumption. In addition, no additional switching capacity and the link bandwidth are required to transmit the parity segments, since the surplus switching capacity and the surplus bandwidth of the protection packet switch for the 1:3 switch redundancy can be utilized for the purpose. And, the recovery of any errored or discarded segments can be easily implemented by just adding simple circuits such as, for example, the bitwise XOR calculation circuits and so on).

The switch failure, the link fault, and the packet error or drop can be addressed by a common mechanism utilizing the parity segments (see FIGS. 3 to 5). That is, for example, neither dynamic control of, for example, the load balancer for 1:N switch redundancy to avoid any failed switch or any failed link nor retransmission of the errored or discarded packets are needed. In addition, since the lost packets due to switch or link failure can be recovered autonomously by the egress, 1:N protection switching to avoid the failed switch or the failed link can be hitless.

And, since the errored or discarded packets can be also recovered autonomously by the egress without the retransmission of the packets, low transmission delay can be preserved. It might be worth to note that the increment of the transmission delay due to the additional queuing of the ODU segments to wait the corresponding parity segment is about 3.2 [µs] even for the worst case of ODU0.

Since segments can be statically distributed to the packet switches by the ingress, dynamically controlled load balancer or the like is not required. In addition, neither any protocol to notify to the ingress the switch or the link failure detected by the egress nor any routing protocol to advertise the reachability to the destination egress is not required.

The afore-mentioned M may be set to $M=2^m-1$ (m is a natural number of 2 or larger). In the examples illustrated in FIG. 2 or the like, $M=3(m=2)$ is assumed. In this case, the sequence number of the parity segment can be derived by the bitwise XOR calculation over the segment number of the ODU segments belonging to the same parity group. The M+1 segments belonging to the same parity group are identified by the most significant $(16-\text{Log}_e(M+1))$ bits of the PWMCW sequence number. In addition, the individual ODU or parity segment belonging to each parity group can be mutually identified by the least significant $\text{Log}_e(M+1)$ bits of the PWMCW sequence number.

The afore-mentioned N may be set to $N+1=2^{(m+k)}$ (k is a natural number of 0 or larger). In the examples illustrated in FIG. 2 or the like, $N=3$ ($m=2$, $k=0$) is assumed. In this case, the ingress can distribute every four segments belonging to the same parity group statically to the packet switches in accordance with the least significant (m+k) bits of the PWMCW sequence number. Thus, the distribution circuit of the ingress can be simplified.

As described above, according to the transmission apparatus, the transmission method, and the transmission processing, the service disruption due to single equipment failure can be avoided and low transmission delay can be preserved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission apparatus comprising:
a plurality of input circuits that includes a first input circuit;
N+1 switches (N is a natural number of 2 or larger); and
a plurality of output circuits that includes a first output circuit, wherein
the first input circuit divides inputted data into partial data in a predetermined length, and distributes M+1 segments, where M is a natural number of 2 or larger and N or smaller, to the N+1 switches, the M+1 segments including M data segments and a parity segment, each of the M data segments corresponding to each of continuous M pieces of partial data, the parity segment corresponding to horizontal parities calculated over the M data segments, and the first output circuit is further configured to:
restore the data inputted to the first input circuit using M segments among the M+1 segments which are distributed and transmitted by the first input circuit to the N+1 switches and transferred by the N+1 switches, the M segments including the parity segment, and
output the restored data, wherein
the first output circuit includes:
a receiving circuit that receives the M data segments and the parity segment distributed and transmitted to the N+1 switches by the first input circuit and transferred by the N+1 switches; and
a processor that restores the data inputted to the first input circuit and outputs the restored data, using at least any of the M data segments and the parity segment which are received by the receiving circuit.

2. The transmission apparatus according to claim 1, wherein
a total bandwidth of data which may be processed by the N+1 switches is wider than a total bandwidth of data transmitted from the plurality of input circuits and narrower than twice of the total bandwidth of data transmitted from the plurality of input circuits.

3. The transmission apparatus according to claim 1, wherein
$M=2^m-1$, where m is a natural number of 2 or larger, and
for every M pieces of partial data, the first input circuit distributes and transmits to the N+1 switches the M pieces of partial data each being assigned with a header including a sequence number, and the horizontal parities assigned with a header including a sequence number which is an exclusive OR of every sequence numbers assigned to the M pieces of partial data.

4. The transmission apparatus according to claim 3, wherein
$N+1=2^{(m+k)}$, where k is a natural number of 0 or larger.

5. The transmission apparatus according to claim 1, wherein
for every M pieces of partial data, the first input circuit appends a forward error correction code to each of the headers assigned to the M pieces of partial data and the header assigned to the horizontal parities, and transmits the M pieces of partial data and the horizontal parities to which the forward error correction code is appended, and
the first output circuit performs error correction processing based on the forward error correction code for the headers assigned to the M pieces of partial data and the horizontal parities, and checks the normality of the headers each assigned to the M pieces of partial data and the horizontal parities after the error correction processing is performed.

6. The transmission apparatus according to claim 1, wherein
the partial data comprises
a padding inserted so that data length of the partial data is fixed; and
a header which indicates the data length of the partial data before the padding and the header are inserted.

7. The transmission apparatus according to claim 1, wherein
the first input circuit comprises:
a processor that divides data inputted to the first input circuit into the partial data in the predetermined length; and
a distribution circuit that distributes and transmits to the N+1 switches the M pieces of partial data and the horizontal parities calculated over the M pieces of partial data, for every continuous M pieces of partial data, where M is a natural number of 2 or larger and N or smaller.

8. The transmission apparatus according to claim 1, wherein
the horizontal parities is obtained by calculating an exclusive OR (XOR) for each bit of M data segments.

9. The transmission apparatus according to claim 1, wherein
the first output circuit further configured to:
restore, when first data segment among the M+1 segments unsuccessfully receives, the first data segment based on segments excluding the first data segment from the M data segments and the parity segment, and
restore the data inputted to the first input circuit based on the restored first segments and the segments.

10. The transmission apparatus according to claim 1, wherein
the first input circuit transfers the parity segment to a first switch of the N+1 switches where the M data segments is not transferred.

11. A transmission method executed by a transmission apparatus that includes a plurality of input circuits, N+1 switches, where N is a natural number of 2 or larger, and a plurality of output circuits, the method comprising:
using the N+1 switches, outputting from any of a plurality of output circuits each data inputted from a plurality of input circuits;
using a first input circuit included in the input circuits, dividing inputted data into partial data in a predetermined length and distributing and transmitting M+1 segments, where M is a natural number of 2 or larger and N or smaller, to the N+1 switches, the M+1 segments including M data segments and a parity segment, each of the M data segments corresponding to each of continuous M pieces of partial data the parity segment corresponding to horizontal parities calculated over the M; and
using a first output circuit included in the output circuits, restoring the data inputted to the first input circuit using M segments among the M+1 segments which are distributed and transmitted by the first input circuit to the N+1 switches and transferred by the N+1 switches, the M segments including the parity segment, and outputting the restored data, wherein
the first output circuit includes:
a receiving circuit that receives the M data segments and the parity segment distributed and transmitted to the N+1 switches by the first input circuit and transferred by the N+1 switches; and
a processor that restores the data inputted to the first input circuit and outputs the restored data, using at least any of the M data segments and the parity segment which are received by the receiving circuit.

* * * * *